United States Patent
Sikka et al.

(10) Patent No.: US 11,593,756 B2
(45) Date of Patent: Feb. 28, 2023

(54) AUTOMATED GUIDED VEHICLE CONTROL AND ORGANIZING INVENTORY ITEMS USING PREDICTIVE MODELS FOR SLOW ITEM TYPES

(71) Applicant: Staples, Inc., Framingham, MA (US)

(72) Inventors: Sandeep Sikka, Natick, MA (US);
Nitin Verma, Natick, MA (US);
Michael Bhaskaran, Sherborn, MA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 17/341,003

(22) Filed: Jun. 7, 2021

(65) Prior Publication Data

US 2021/0294353 A1 Sep. 23, 2021

Related U.S. Application Data

(62) Division of application No. 16/044,210, filed on Jul. 24, 2018, now Pat. No. 11,030,573.

(51) Int. Cl.
*G06Q 10/08* (2012.01)
*G06Q 10/087* (2023.01)
(Continued)

(52) U.S. Cl.
CPC ......... *G06Q 10/087* (2013.01); *B65G 1/0492* (2013.01); *B65G 1/137* (2013.01);
(Continued)

(58) Field of Classification Search
CPC ............ G06Q 10/087; G06Q 30/0202; B65G 1/0492; B65G 1/137; G06N 5/046;
(Continued)

(56) References Cited

U.S. PATENT DOCUMENTS

| 5,134,291 A | 7/1992 | Ruhl et al. |
| 6,289,260 B1 | 9/2001 | Bradley et al. |

(Continued)

OTHER PUBLICATIONS

Roodbergen, Kees Jan, and Iris FA Vis. "A survey of literature on automated storage and retrieval systems." European journal of operational research 194.2 (2009): 343-362. (Year: 2009).*

(Continued)

*Primary Examiner* — Nathan A Mitchell
(74) *Attorney, Agent, or Firm* — VLP Law Group LLP; Michel Bohn

(57) ABSTRACT

In an example embodiment, a method determines a container containing one or more items associated with one or more item types, the container located at a current position in a storage facility; determines one or more order likelihoods of the one or more item types contained in the container; determines a container utilization likelihood of the container based on the one or more order likelihoods of the one or more item types contained in the container; determines an optimal position for the container in the storage facility based on the container utilization likelihood of the container, the optimal position being different from the current position of the container; and instructing an automated guided vehicle (AGV) to transport the container from the current position of the container to the optimal position of the container in the storage facility.

18 Claims, 10 Drawing Sheets

(51) Int. Cl.
  B65G 1/04        (2006.01)
  B65G 1/137       (2006.01)
  G06Q 30/0202     (2023.01)
  G06N 5/046       (2023.01)
  G05D 1/00        (2006.01)

(52) U.S. Cl.
  CPC .......... *G05D 1/0088* (2013.01); *G06N 5/046* (2013.01); *G06Q 30/0202* (2013.01); *G05D 2201/0216* (2013.01)

(58) Field of Classification Search
  CPC ................. G06N 20/00; G05D 1/0088; G05D 2201/0216; G05D 1/0297
  See application file for complete search history.

(56) References Cited

U.S. PATENT DOCUMENTS

| | | | |
|---|---|---|---|
| 8,024,064 | B1 | 9/2011 | Sanghavi et al. |
| 8,090,712 | B2 | 1/2012 | Shellshear |
| 8,965,562 | B1 | 2/2015 | Wurman et al. |
| 9,111,251 | B1* | 8/2015 | Brazeau ............... B65G 43/00 |
| 9,120,622 | B1 | 9/2015 | Elazary et al. |
| 9,452,883 | B1* | 9/2016 | Wurman .............. G05B 13/026 |
| 9,965,730 | B2 | 5/2018 | Hance et al. |
| 10,427,873 | B1 | 10/2019 | Mause et al. |
| 10,504,055 | B2 | 12/2019 | Hance et al. |
| 10,650,344 | B2 | 5/2020 | Qin |
| 10,796,278 | B1* | 10/2020 | Wintz .................... G06N 20/00 |
| 2002/0143669 | A1 | 10/2002 | Scheer |
| 2007/0017984 | A1 | 1/2007 | Mountz et al. |
| 2007/0094101 | A1 | 4/2007 | Breitling |
| 2008/0071418 | A1 | 3/2008 | Antony et al. |
| 2009/0082902 | A1 | 3/2009 | Foltz et al. |
| 2009/0216364 | A1 | 8/2009 | Grissom |
| 2013/0197869 | A1 | 8/2013 | Fritz et al. |
| 2013/0226649 | A1* | 8/2013 | Grissom .......... G06Q 10/06315 705/7.25 |
| 2013/0338819 | A1 | 12/2013 | Max |
| 2015/0073587 | A1* | 3/2015 | Vliet ...................... G06Q 10/08 700/216 |
| 2015/0161545 | A1 | 6/2015 | Willemain et al. |
| 2015/0291356 | A1 | 10/2015 | Oki et al. |
| 2015/0314331 | A1 | 11/2015 | Thorsson |
| 2016/0042314 | A1 | 2/2016 | Mountz et al. |
| 2016/0060032 | A1 | 3/2016 | Kim et al. |
| 2017/0091704 | A1* | 3/2017 | Wolf .................... G06Q 10/087 |
| 2017/0315918 | A1 | 11/2017 | Nikitaki et al. |
| 2017/0330259 | A1 | 11/2017 | Deshpande et al. |
| 2018/0005173 | A1 | 1/2018 | Elazary et al. |
| 2018/0060764 | A1* | 3/2018 | Hance .............. G06Q 10/06315 |
| 2018/0060765 | A1* | 3/2018 | Hance ................... B65G 57/02 |
| 2018/0068255 | A1* | 3/2018 | Hance ............... G06Q 10/043 |
| 2018/0127211 | A1 | 5/2018 | Jarvis et al. |
| 2018/0251300 | A1 | 9/2018 | Kapuria et al. |
| 2018/0253680 | A1 | 9/2018 | Jahani |
| 2018/0319590 | A1* | 11/2018 | Lindbo ................... G07F 17/12 |
| 2019/0138978 | A1 | 5/2019 | Johnson et al. |
| 2019/0259043 | A1 | 8/2019 | Koneri et al. |
| 2019/0266552 | A1 | 8/2019 | Gupta et al. |
| 2019/0272491 | A1 | 9/2019 | Das et al. |
| 2019/0347607 | A1 | 11/2019 | Shi et al. |
| 2019/0378232 | A1 | 12/2019 | Goren et al. |

OTHER PUBLICATIONS

Egas, Carl and Masel, Dale, "Determining Warehouse Storage Location Assignments Using Clustering Analysis" (2010). 11th IMHRC Proceedings (Milwaukee, Wisconsin. USA—2010). (Year: 2010).

Kim, Byung Soo, et al., Slotting methodology using correlated improvement for a zone-based carton picking distribution system, Computers & Industrial Engineering, vol. 62, Issue 1, 2012, pp. 286-295. (Year: 2012).

Li, Yingde, et al., Dynamic Slotting Optimization Based on SKUs Correlations in a Zone-based Wave-picking System, 2012, 12th IMHRC Proceedings (Gardanne, France—2012.

Matthews, J. & Visagie, S. E. 2015. SKU assignment to unidirectional picking lines using correlations. Orion, 31(2):61-76, doi: 10.5784/31-2-531. (Year: 2015).

M. Kofler et al. "Re-warehousing vs. healing: Strategies for warehouse storage location assignment," 3rd IEEE International Symposium on Logistics and Industrial Informatics, 2011, pp. 77-82. (Year: 2011).

Wutthisirisart, Phichet. Relation-based item slotting. University of Missouri-Columbia, 2010. (Year: 2010).

Le-Duc et al. Travel distance estimation and storage zone optimization in a 2-block class-based storage strategy warehouse, pp. 3561-3581, Published online: Feb. 22, 2007.

Chan, F., et al., Improving the productivity of order picking of a manual-pick and multi-level rack distribution warehouse through the implementation of class-based storage, Expert Systems with Applications. vol. 38, Issue 3, Mar. 2011, pp. 2686-2700.

Kovacs, A., Optimizing the storage assignment in a warehouse served by milkrun logistics, Int. J. Production Economics 133 (2011) 312-318. Available online Feb. 1, 2010.

Hoshino et al. Highly efficient AGV transportation system management using agent cooperation and container storage planning, 2005 IEEE/RSJ International Conference on Intelligent Robots and Systems, Edmonton, Alta., 2005, pp. 1588-1593.

Aljalbout, et al. Clustering with Deep Learning: Taxonomy and New Methods, Computer Vision Group, Technical University of Munich, Sep. 17, 2018, https://arxiv.org/pdf/1801.07648.pdf, 12 pages.

Bartholdi, III et al., Warehouse and Distribution Science. The Supply Chain and Logistics Institute, School of Industrial and Systems Engineering, Georgia Institute of Technology, Revised Aug. 19, 2014, https://www2.isye.gatech.edu/~jjb/wh/book/editions/wh-sci-0.96.pdf, 323 pages.

Decisioncraft Inc., Warehouse Activity ProFiling and Order Picking Productivity, Issue No. Jun. 7, 2001, Accessed May 14, 2018, http://www.decisioncrafl.com/dmdirect/warehouse_profiling.htm, 2 pages.

Egas, et al. Determining Warehouse Storage Location Assignments Using Clustering Analysis. Ohio University: Department of Industrial and Systems Engineering, pp. 1-7, 2010, https://digitalcommons.georgiasouthern.edu/pmhr 2010/19.

Han et al. Data mining: Concepts and techniques (3rd ed., Morgan Kaufmann series in data management systems), Burlington, Mass.: Elsevier, 2012, pp. 487-568, Retrieved from: https://lwww.scribd.com/document/339025636/Cluster-Analysis-pdf.

Park, et al., Algorithms for Generalized Cluster-wise Linear Regression, May 17, 2016, https://arxiv.org/pdf/1607.01417.pdf, 29 pages.

Seward, Optimal Picer Routing; How Zalando Accelerates Warehouse Operations with Neural Networks, Slides. Dataconomy Media: Data and Analytics, Jan. 2016, https://www.slideshare.net/Dataconomy/how-zalando-accelerates-warehouse-operations-with-neural-networks-calvin-seward-data-scientist-at-zalando, 29 pages.

Wikipedia, Loss Functions for Classification, Wikimedia Foundation, Apr. 25, 2018, https://en.wikipedia.org/wiki/Loss_functions_for_classification, 6 pages.

Yun et al., An Efficient Clustering Algorithm for Market Basket Data Based on Small Large Ratios, Department of Electrical engineering, National Taiwan University, Proceedings: COMPSAC, the IEEE Computer Society's International Computer Software & Applications, Jan. 1, 2001, pp. 505-510. https://citeseerx.ist.psu.edu/viewdoc/download?doi=10.1.1.15.1452&rep=rep1&type=pdf.

* cited by examiner

AUTOMATED GUIDED VEHICLE CONTROL AND ORGANIZING INVENTORY ITEMS USING PREDICTIVE MODELS FOR SLOW ITEM TYPES

BACKGROUND

The present disclosure relates to controlling automated guided vehicles (AGVs) and organizing inventory items in a storage facility. In a more particular example, the present disclosure relates to controlling automated guided vehicles and organizing inventory items in the storage facility using item identifier models.

Today, some modern storage facilities rely on order history of item types (e.g., SKUs) to organize the item types in storage area. For example, these storage facilities may store the item types in the storage area according to the order frequencies of these item types. However, this existing approach is generally inefficient because only a limited number of item types are often ordered frequently while the majority of the item types are not. Therefore, it is typically impossible or impractical to organize the majority of the item types that are not frequently ordered using this existing approach, because their order frequencies are similarly low. In addition, the existing solutions are generally incapable of determining an appropriate time to release the customer orders to be fulfilled at picking stations, and/or determining whether to maintain containers at the picking stations to fulfill incoming customer orders that may also request the item types stored in the containers. Therefore, the existing solutions often require the containers to be transported to and from the picking stations frequently, and thus causing inefficiency in the order fulfillment process.

SUMMARY

According to one innovative aspect of the subject matter described in this disclosure, a method comprises: receiving an instruction to transport a container from a current position of the container to a first position in a storage aisle of a storage facility, the first position in the storage aisle determined based on a first container utilization likelihood of the container in a first time window, the first time window associated with a first window duration and a first timestamp; instructing a picking automated guided vehicle (picking-AGV) to move to the current position of the container; receiving, from the picking-AGV, an input identifying the current position of the container; responsive to receiving from the picking-AGV the input identifying the current position of the container, instructing the picking-AGV to retrieve the container from the current position of the container; instructing the picking-AGV to move to the first position in the storage aisle; receiving, from the picking-AGV, an input identifying the first position in the storage aisle; and responsive to receiving from the picking-AGV the input identifying the first position in the storage aisle, instructing the picking-AGV to place the container at the first position in the storage aisle.

In general, another innovative aspect of the subject matter described in this disclosure may be embodied in methods comprising: determining a container containing one or more items associated with one or more item types, the container located at a current position in a storage facility; determining one or more order likelihoods of the one or more item types contained in the container; determining a container utilization likelihood of the container based on the one or more order likelihoods of the one or more item types contained in the container; determining an optimal position for the container in the storage facility based on the container utilization likelihood of the container, the optimal position being different from the current position of the container; and instructing an automated guided vehicle (AGV) to transport the container from the current position of the container to the optimal position of the container in the storage facility.

In general, another innovative aspect of the subject matter described in this disclosure may be embodied in a system that includes one or more processors; and one or more memories storing instructions that, when executed by the one or more processors, cause the system to: determine a container containing one or more items associated with one or more item types, the container located at a current position in a storage facility; determine one or more order likelihoods of the one or more item types contained in the container; determine a container utilization likelihood of the container based on the one or more order likelihoods of the one or more item types contained in the container; determine an optimal position for the container in the storage facility based on the container utilization likelihood of the container, the optimal position being different from the current position of the container; and instruct an automated guided vehicle (AGV) to transport the container from the current position of the container to the optimal position of the container in the storage facility.

These and other embodiments may each optionally include one or more of the following features, such as: that the first container utilization likelihood of the container in the first time window is determined based on one or more order likelihood of one or more item types in the first time window, the one or more item types contained in the container, and the current position of the container is one of a storage position in a temporary storage area of the storage facility, and a second storage position in the storage aisle that is different from the first position in the storage aisle; that responsive to instructing the picking-AGV to place the container at the first position in the storage aisle, updating the current position of the container to be the first position in the storage aisle, receiving an instruction to transport the container to a picking station of the storage facility to fulfill a customer order, the customer order requesting an item type contained in the container, responsive to receiving the instruction to transport the container to the picking station, instructing the picking-AGV to transport the container from the updated current position of the container to the picking station, and instructing a cart automated guided vehicle (cart-AGV) to transport a shipping box associated with the customer order to the picking station; that receiving an instruction to transport the container from the picking station to a second position in the storage aisle, the second position in the storage aisle determined based on a second container utilization likelihood of the container in a second time window, the second time window associated with the first window duration and a second timestamp, the second position in the storage aisle being different from the first position in the storage aisle, and instructing the picking-AGV to transport the container from the picking station to the second position in the storage aisle; that receiving an instruction to transport the container from the picking station to a second position in a temporary storage area of the storage facility, the second position in the temporary storage area determined based on a second container utilization likelihood of the container in a second time window, the second time window associated with a second window duration and a second timestamp, and instructing the picking-AGV to transport the container from the picking station to the second position in the temporary storage area.

These and other embodiments may each optionally include one or more of the following features, such as: that determining the one or more order likelihoods of the one or more item types contained in the container includes determining, using a trained predictive model associated with a window duration, the one or more order likelihoods of the one or more item types in a time window, the time window specified by the window duration and a current timestamp; that determining the container utilization likelihood of the container includes estimating the container utilization likelihood of the container in a time window to be a maximal order likelihood among the one or more order likelihoods of the one or more item types contained in the container in the time window; that determining the container utilization likelihood of the container includes determining the container utilization likelihood of the container in a time window, and determining the optimal position for the container in the storage facility includes determining that the optimal position of the container associated with a storage aisle in the storage facility, determining other containers associated with the storage aisle, determining a rank for the container based on the container utilization likelihood of the container in the time window relative to other container utilization likelihoods of the other containers in the time window, and determining the optimal position for the container in the storage aisle based on the rank of the container; that determining the optimal position for the container in the storage aisle based on the rank of the container includes determining the optimal position in the storage aisle that has a distance to a pick-to-carton area of the storage facility proportional to the rank of the container; that determining the container utilization likelihood of the container includes determining the container utilization likelihood of the container in a time window, and determining the optimal position for the container in the storage facility includes determining that the container utilization likelihood of the container in the time window satisfies a predefined container utilization likelihood threshold, and responsive to determining that the container utilization likelihood of the container in the time window satisfies the predefined container utilization likelihood threshold, determining the optimal position for the container to be in a temporary storage area of the storage facility; that determining the container utilization likelihood of the container includes determining the container utilization likelihood of the container in a time window, and determining the optimal position for the container in the storage facility includes determining that the current position of the container associated with a picking station of the storage facility, determining that the container utilization likelihood of the container in the time window satisfies a predefined container utilization likelihood threshold, and responsive to determining that the container utilization likelihood of the container in the time window satisfies the predefined container utilization likelihood threshold, determining the optimal position for the container to be in the picking station of the storage facility; that receiving a customer order requesting a first item type, determining a first order likelihood of the first item type in a time window, determining that the first order likelihood of the first item type in the time window satisfies a predefined order likelihood threshold, and responsive to determining that the first order likelihood of the first item type in the time window satisfies the predefined order likelihood threshold, postponing a fulfillment of the customer order; that receiving a customer order requesting a first item type among the one or more item types contained in the container, and responsive to instructing the AGV to transport the container to the optimal position of the container in the storage facility, assigning the customer order to a picking station in the storage facility to fulfill the customer order at the storage facility; that determining one or more first order likelihoods of one or more first item types in a time window, determining, from the one or more first item types, one or more likely-ordered item types, the first order likelihood of the one or more likely-ordered item types in the time window satisfying a predefined order likelihood threshold, aggregating the one or more likely-ordered item types into one or more groups of likely-ordered item types based on item velocity of the one or more likely-ordered item types, the one or more groups of likely-ordered item types including a first group of likely-ordered item types and a second group of likely-ordered item types, assigning the first group of likely-ordered item types to a first storage aisle and assigning the second group of likely-ordered item types to a second storage aisle, determining a first container containing a first item type in the first group of likely-ordered item types, determining a first optimal position for the first container containing the first item type in the first storage aisle, determining a second container containing a second item type in the second group of likely-ordered item types, and determining a second optimal position for the second container containing the second item type in the second storage aisle; that a number of groups of likely-ordered item types equals to a number of storage aisles in the storage facility, a number of likely-ordered item types in the first group of likely-ordered item types substantially equals to a number of likely-ordered item types in the second group of likely-ordered item types, and a total item velocity of the likely-ordered item types in the first group of likely-ordered item types substantially equals to a total item velocity of the likely-ordered item types in the second group of likely-ordered item types.

Other embodiments of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DESCRIPTION

The technology presented in this disclosure addresses the problems discussed in the Background Section. For example, the technology described herein is capable of determining order likelihoods of item types (e.g., different types of items associated with different stock keeping units (SKUs)) and container utilization likelihoods of containers (e.g., mini-pallets) in various future time windows (e.g., time windows of 3 hours, 2 days, 1 month, etc. subsequent to a timestamp). As a result, the present technology can execute adaptive operations to improve various functionalities performed in the storage facility accordingly. For example, the present technology may determine optimal positions for the containers in the storage facility based on these determined likelihoods, and relocate the containers to the optimal positions to facilitate the retrieval of the item types likely requested in future customer orders. Thus, the containers can be efficiently organized to facilitate the order fulfillment even if the containers contain the item types having insufficient order history. In another example, the present technology may maintain the containers at picking stations and/or release the customer orders to be fulfilled at the picking stations based on these determined likelihoods. As a result, once a container storing a requested item type is transported to and/or maintained at the picking station, such container may likely be used to fulfill other incoming customer orders that also request the item type, thereby improving the efficiency of the fulfillment process.

Figure 1:
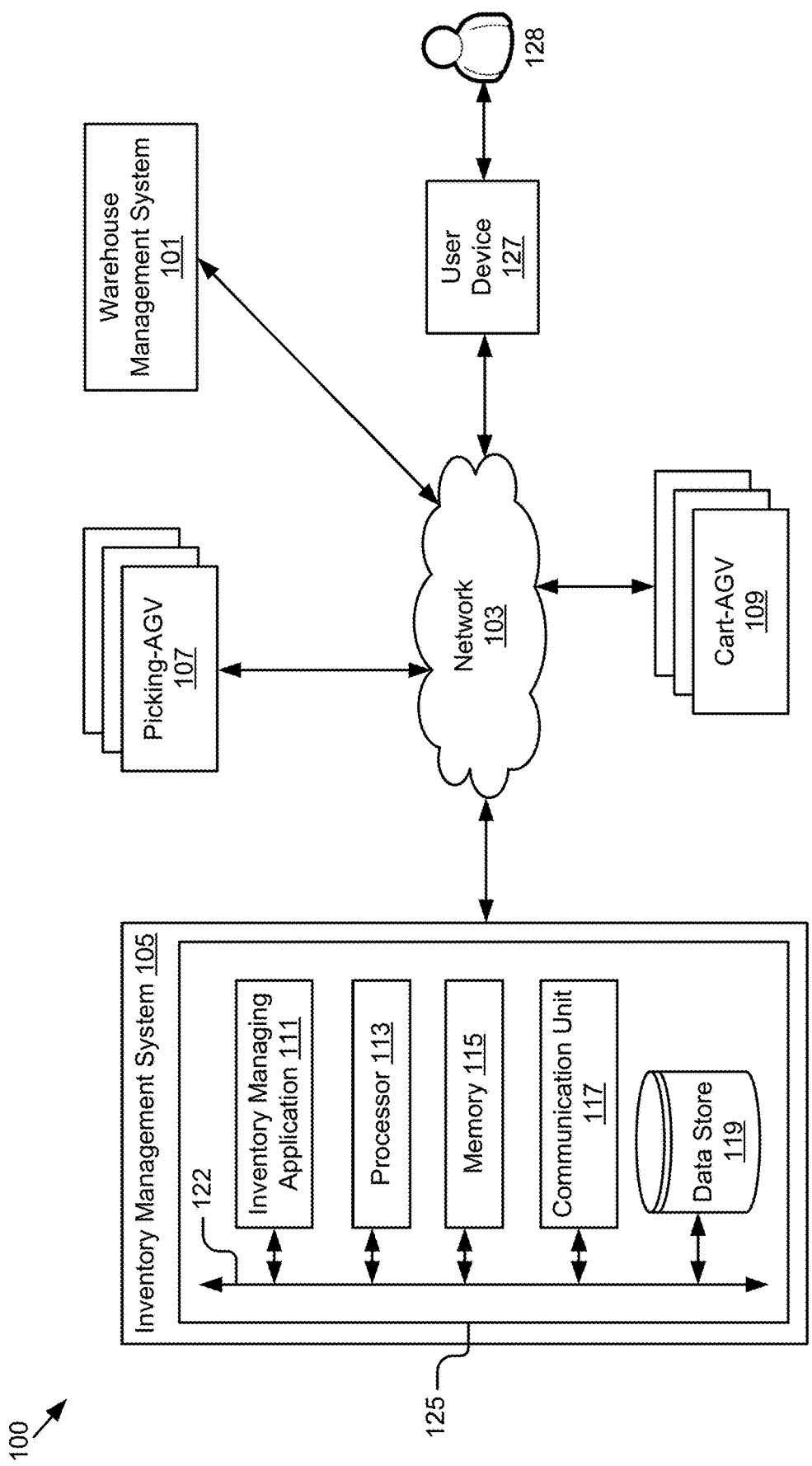
FIG. 1 is a block diagram of an example system for controlling AGVs and organizing containers storing inventory items using item identifier models.

FIG. 1 is a block diagram of an example system 100 for controlling AGVs and organizing inventory items using item identifier models. As shown, the system 100 includes a warehouse management system 101, an inventory management system 105, one or more picking-AGVs 107, one or more cart-AGVs 109, and a user device 127 coupled for electronic communication via a network 103. It should be understood that the system 100 depicted in FIG. 1 is provided by way of example and the system 100 and/or further systems contemplated by the present disclosure may include additional and/or fewer components, may combine components and/or divide one or more of the components into additional components, etc. For example, the system 100 may include any number of warehouse management systems 101, inventory management systems 105, picking-AGVs 107, cart-AGVs 109, or user devices 127.

The network 103 may be a conventional type, wired and/or wireless, and may have numerous different configurations including a star configuration, token ring configuration, or other configurations. Furthermore, the network 103 may include one or more local area networks (LAN), wide area networks (WAN) (e.g., the Internet), personal area networks (PAN), cellular networks, public networks, private networks, virtual networks, virtual private networks, peer-to-peer networks, near field networks (e.g., Bluetooth, NFC, etc.), and/or other interconnected data paths across which multiple devices may communicate.

The network 103 may also be coupled to or include portions of a telecommunications network for sending data in a variety of different communication protocols. Example protocols include, but are not limited to, transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other suitable protocols. In some embodiments, the network 105 is a wireless network using a connection such as DSRC (Dedicated Short Range Communication), WAVE, 802.11p, a 3G, 4G, 5G+ network, WiFi™, satellite networks, or other suitable networks. Although FIG. 1 illustrates a single block for the network 103 that couples to the warehouse management system 101, the inventory management system 105, the picking-AGVs 107, the cart-AGVs 109, and the user device 127, it should be understood that the network 103 may in practice comprise any number of combination of networks, as noted above.

The warehouse management system (WMS) 101 can manage a variety of tasks to support and/or control operations of a storage facility. In some embodiments, the WMS 101 may include a hardware and/or virtual server that includes processor(s), memory(ies), and network communication capabilities (e.g., communication unit(s)). The WMS 101 may be communicatively coupled to the network 103, as reflected by signal line 116. In some embodiments, the WMS 101 may send and receive data to and from other components of the system 100. For example, the WMS 101 may keep track of the inventory level of an item type (e.g., as identified by an item identifier (e.g., SKU)), and send a purchase order to a vendor server when the inventory level of the item type is low. In another example, the WMS 101 may receive customer orders assigned to the storage facility, process the customer orders, and send the customer orders to the inventory management system 105 for managing the order fulfillment. In some embodiments, the WMS 101 may receive an order redirection request associated with a customer order from the inventory management system 105, and send the customer order to other storage facilities so that the customer order can be fulfilled at a different storage facility among these storage facilities.

The Automated Guided Vehicle(s) (AGVs) are robotic vehicles operating in the storage facility. In some embodiments, the AGV(s) may include drive unit(s) adapted to provide motive force for moving the AGVs and attached component(s) (e.g., AGV carts, AGV racks, AGV shelves, etc.), guidance system(s) for determining position of the AGVs within the storage facility, equipment(s) for carrying items, etc. Non-limiting examples of the equipment for carrying items include, but are not limited to, carton holders, container holders, AGV shelves, etc. In some embodiments, the AGV(s) may include scanner(s) adapted to read identifiers of objects and/or locations in the storage facility. For example, the scanners may be optical scanners adapted to scan graphic markers (e.g., barcode, Quick Response (QR) code, Radio Frequency Identification (RFID) label, etc.) attached to various objects (e.g., containers, inventory items, shipping boxes, etc.) and/or various locations (e.g., picking station, storage aisle, rack unit, shelf, storage position, etc.) to obtain their unique identifiers. In some embodiments, the AGVs may include the picking-AGVs 107, the cart-AGVs 109, etc. Other types of AGV are also possible and contemplated.

The picking-AGV 107 is an automated guided vehicle or robot configured to autonomously transport one or more containers. In some embodiments, the container may be the storage unit that can be retrieved and transported between various physical positions in the storage facility (e.g., storage aisles in high-density storage area, picking stations in pick-to-carton area, temporary storage area, replenishment area, etc.). In some embodiments, the container may be adapted to store inventory items belonging to one or more item types (e.g., one or more SKUs). For example, the container may include one or more compartments (e.g., storage bins) to separately store inventory item(s) belonging to one item type in each compartment. In this present disclosure, the item type(s) of the inventory items stored in the container may simply be referred to as the item type(s) contained in the container. In some embodiments, the container may be divided into multiple compartments by one or more movable division elements, and thus the compartments of the container can be dynamically resized. Non-limiting examples of the container include a mini-pallet having 3 compartments, a storage box having 5 compartments, etc. Other types of containers are also possible and contemplated.

In some embodiments, the picking-AGV 107 may include a container holder (e.g., AGV carts, AGV shelves, etc.) adapted to hold one or more containers. In some embodiments, the picking-AGV 107 may include a container handling mechanism adapted to autonomously retrieve the containers from the shelves of the rack units in the storage aisle, place the containers on the container holders (e.g., the AGV shelf) of the picking-AGV 107, place the containers at the picking stations, return the containers to the shelves of the rack units in the storage aisle, etc. As an example, the picking-AGV 107 may retrieve a container from a shelf of a rack unit in a storage aisle, place the container on its container holder, and transport the container to a picking station. In this example, after the human worker 128 in the picking station picks inventory items from the container and places the inventory items into cartons to fulfill the customer orders, the picking-AGV 107 may return the container to the shelf of the rack unit in the storage aisle.

The cart-AGV 109 is an automated guided vehicle or robot configured to autonomously transport cartons to and from picking stations of the storage facility. In some embodiments, the cart-AGV 109 may include a carton holder (e.g., AGV carts, AGV shelves, etc.) adapted to hold cartons. In some embodiments, the cartons may include a box (e.g., a shipping box) adapted to hold inventory items. For example, a cart-AGV 109 may push/pull a cart (e.g., the carton holder) holding one or more cartons around the pick-to-carton area, and may automatically stop at picking stations in the pick-to-carton area so that the human workers 128 in the picking stations can place inventory items into the cartons to fulfill the customer orders. In some embodiments, once the cartons are completed with the corresponding ordered items, the cart-AGV 109 may transport the cart with the cartons to a shipping dock of the storage facility to send the cartons to the customers.

The user device 127 is a computing device that includes memory(ies), processor(s), input/output device(s), and communication unit(s). The user device 127 may be coupled to the network 103, as reflected by signal line 118, to send and receive data to and from the WMS 101, the inventory management system 105, the picking-AGV(s) 107, the cart-AGV(s) 109, and/or any other components of the system 100. Non-limiting examples of the user device 127 include, but are not limited to, desktop computers, laptop computers, tablet computers, holographic computers, mobile phones, personal digital assistants (PDA), or any other electronic devices capable of displaying data and/or receiving input data and providing the input data to other components of the system 100. In some embodiments, the user device 127 may display information of one or more customer orders to the human worker 128. In some embodiments, for each customer order, the user device 127 may display the ordered item type(s) (e.g., the ordered SKU(s)), the order quantity of each ordered item type, the fulfillment status (e.g., order received for fulfillment, in progress, order completed, etc.), etc. of the customer order on its input/output device, and thus the human worker 128 in the picking station may place one or more ordered items into the carton accordingly. In some embodiments, the human worker 128 may interact with the user device 127 to enter the input data. For example, the human worker 128 may enter the input data indicating that a particular item type (e.g., copy paper ABC) needs to be replenished. Other types of input data are also possible and contemplated.

The inventory management system 105 can manage the placement of multiple containers in various physical areas of the storage facility (e.g., high-density storage area, pick-to-carton area, temporary storage area, etc.). In some embodiments, the inventory management system 105 may include computing device(s) 125, the computing device(s) 125 may include an inventory managing application 111, processor(s) 113, memory(ies) 115, communication unit(s) 117, and data store(s) 119. In some embodiments, the inventory management system 105 may be coupled to the network 103 via the signal line 112, and may send and receive data to and from the WMS 101, the picking-AGV(s) 107, the cart-AGV(s) 109, the user device(s) 127, and/or any other components of the system 100 via the network 103.

The processor 113 may execute software instructions by performing various input, logical, and/or mathematical operations. The processor 113 may have various computing architectures to method data signals including, for example, a complex instruction set computer (CISC) architecture, a reduced instruction set computer (RISC) architecture, and/or an architecture implementing a combination of instruction sets. The processor 113, which may include one or more processors, may be physical and/or virtual, and may include a single core or plurality of processing units and/or cores. In some embodiments, the processor 113 may be capable of generating and providing electronic signals to the picking-AGVs 107, the cart-AGVs 109, and the user device 127, performing complex tasks such as item identifier clustering, storage location management, etc. In some embodiments, the processor 113 may be coupled to the memory 115 via the bus 122 to access data and instructions therefrom and store data therein. The bus 122 may couple the processor 113 to the other components of the computing device 125 including, for example, the inventory managing application 111, the memory 115, the communication unit 117, and/or the data store 119.

The memory 115 may store and provide access to data to the other components of the computing device 125. The memory 115 may be included in a single computing device or a plurality of computing devices. In some embodiments, the memory 115 may store instructions and/or data that may be executed by the processor 113. For example, the memory 115 may store the inventory managing application 111 and/or its respective components, depending on the configuration. The memory 115 is also capable of storing other instructions and data, including, for example, an operating system, hardware drivers, other software applications, databases, etc. The memory 115 may be coupled to the bus 122 for communication with the processor 113 and the other components of computing device 125.

The memory 115 may include a non-transitory computer-usable (e.g., readable, writeable, etc.) medium, which can be any non-transitory apparatus or device that can contain, store, communicate, propagate, or transport instructions, data, computer programs, software, code, routines, etc., for processing by or in connection with the processor 113. In some embodiments, the memory 115 may include one or more of volatile memory and non-volatile memory (e.g., RAM, ROM, hard disk, optical disk, etc.). It should be understood that the memory 115 may be a single device or may include multiple types of devices and configurations.

The bus 122 may include a communication bus for transferring data between components of a computing device or between computing devices, a network bus system including a network or portions thereof, a processor mesh, a combination thereof, etc. In some embodiments, various other components operating on the computing device 125 (operating systems, device drivers, etc.) may cooperate and communicate via a communication mechanism included in or implemented in association with the bus 122. The software communication mechanism may include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. In some embodiments, any or all of the communication can be secure (e.g., SSH, HTTPS, etc.).

The communication unit 117 may include one or more interface devices (I/F) for wired and wireless connectivity among the components the system 100. For example, the communication unit 117 may include, but is not limited to, various types known connectivity and interface options. The communication unit 117 may be coupled to the other components of the computing device 125 via the bus 122. The communication unit 117 may be coupled to the network 103, as reflected by the signal line 112, depending on the configuration. In some embodiments, the communication unit 117 may link the processor 113 to a network (e.g., the Internet, an intranet, etc.), which may in turn be coupled to other processing systems. The communication unit 117 may provide other connections to a network and to servers or computing devices using various standard communication protocols.

The data store 119 includes a non-transitory storage medium that stores various types of data and provides access to the data. The data stored by the data store 119 may be organized and queried using various criteria. For example, the data store 119 may include data tables, databases, or other organized collections of data. In some embodiments, the data store 119 may be included in the computing device 125 or in another computing system and/or storage system distinct from but coupled to or accessible by the computing device 125. In some embodiments, the data store 119 may be incorporated with the memory 115 or may be distinct therefrom. In some embodiments, the data store 119 may store data associated with a database management system (DBMS) operable on the computing device 125. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

In some embodiments, the data stored by the data store 119 may include, but is not limited to, order data, item data, likelihood data, item identifier model data, storage location data, etc. In some embodiments, the order data may describe one or more customer orders to be fulfilled and delivered to the customers. In some embodiments, for each customer order, the order data may include the order identifier (ID) uniquely identifying the customer order, the item identifier(s) uniquely identifying the item type(s) being ordered (e.g., the SKU of "N0503" and the SKU of "S3311"), the product name of each ordered item type (e.g., copy paper ABC and pen DEF), the ordered quantity of each ordered item type (e.g., 3 cases of copy paper ABC and 5 boxes of pen DEF), the order timestamp indicating the date and time at which the customer order is placed (e.g., June 17, 2018—14:00:00), the target fulfillment timestamp indicating the date and time at which the fulfillment of the customer order needs to be completed (e.g., June 18, 2018—14:00:00), etc. Other types of order data are also possible and contemplated.

In some embodiments, the data store 119 may store the item data describing one or more items, their types, descriptions, etc. In some embodiments, each unique item may be an inventory item of a particular type. That type of item may be referred to by a corresponding unique item identifier. An example of a unique item identifier is a SKU, although it should be understood that, while SKUs are used in various embodiments herein, a SKU is merely an example of a product or service identified by a code, and that any other suitable identifiers or identification schemes are contemplated and encompassed by this disclosure.

In some embodiments, the item (e.g., SKU) data may include the item velocity of each item type in the storage facility. In some embodiments, the item velocity of an item type may indicate the order volume of the item type. The order volume of the item type may indicate the number of customer orders that request the item type in a predefined time period (e.g., 480 orders/70 days), and thus reflecting the customer demand of the item type.

In some embodiments, the item data may include item affinities between the item types in the storage facility. In some embodiments, the item affinity between two item types may indicate a frequency of the two item types co-present in the same customer order, and thus reflecting the demand correlation between the two item types. As an example, assuming that among 100 customer orders, there are 80 customer orders including both a first item type and a second item type. In this example, the item affinity between the first item type and the second item type may be 0.8. As another example, assuming that among 100 customer orders including the first item type, there are 60 customer orders also including the second item type. In this example, the item affinity between the first item type and the second item type may be 0.6. Other examples of the item affinity between the item types are also possible and contemplated.

In some embodiments, the data store 119 may store the likelihood data. In some embodiments, the likelihood data may include various order likelihoods of each item type in various time window. In some embodiments, the time window may be specified by a window duration (e.g., 4 hours, 2 days, etc.) and a timestamp at which the time window starts (e.g., $t_{current}=t_1$=June 19, 2018—14:30:00). In some embodiments, the order likelihood of an item type in a time window may indicate the likelihood of the item type being requested in one or more customer orders within the time window. As an example, for the item type of copy paper ABC, the order likelihood of the copy paper ABC in a time window specified by the window duration of 2 days and the current timestamp $t=t_1=$June 19, 2018—14:30:00 may indicate the likelihood of the copy paper ABC being ordered within 2 days since the current timestamp $t=t_1$ (e.g., 0.8).

In some embodiments, the likelihood data may also include various container utilization likelihoods of each container in various time window. The container utilization likelihood of a container in a time window may indicate the likelihood of the container being used to fulfill customer order(s) within the time window, because one or more item types stored in the container are requested in the customer order(s) within that time window. As an example, a container may store the item type of copy paper ABC and the item type of pen DEF. In this example, the container utilization likelihood of the container in the time window specified by the window duration of 2 days and the current timestamp $t=t_1=$June 19, 2018—14:30:00 may indicate the likelihood of the container being used within 2 days since the current timestamp $t=t_1$ to fulfill the customer order(s) that request the copy paper ABC and/or the pen DEF in such time window.

In some embodiments, the data store 119 may store the item identifier model data describing one or more predictive models. In some embodiments, each predictive model may be associated with a window duration (e.g., 4 hours, 2 days, 1 week, etc.) and may be used to determine the order likelihood of an item type in a time window specified by the window duration of the predictive model and a timestamp (e.g., the current timestamp). In this present disclosure, the time window having the window duration of the predictive model may be referred to as the time window corresponding to the predictive model. In some embodiments, for each predictive model associated with a window duration, the item identifier model data may include one or more parameters of the predictive model, and specify one or more predictive features based on which the order likelihood of the item type in a time window corresponding to the predictive model may be determined.

In some embodiments, the data store 119 may store the storage location data. In some embodiments, the storage location data may include a storage position map describing multiple storage positions in various physical areas of the storage facility (e.g., storage positions in storage aisles of high-density storage area, storage positions in temporary storage area, storage positions in picking stations of pick-to-carton area, etc.). In some embodiments, each storage position may be a storage space for placing a container and may be uniquely identified by a storage position ID (e.g., a graphic position marker). In some embodiments, the storage position ID may indicate the storage aisle, the rack unit, the shelf, the distance to a reference point associated with the shelf, etc. for locating the storage position in the storage facility. In some embodiments, the storage location data may also include a convenience metric indicating a level of convenience to retrieve a container from the storage position. In some embodiments, the convenience metric of the storage position may be proportional to the distance between the storage position and the pick-to-carton area of the storage facility. It should be understood that the convenience metric of the storage position may also depend on other factors.

In some embodiments, the storage position map may also map each container to a storage position at which the container is stored. For example, the storage position map may map the container ID uniquely identifying the container to the storage position ID of the storage position. In some embodiments, as the container is transported from one storage position to another, the storage position map may be updated accordingly.

In some embodiments, the storage location data may include a set of convenient item types and a set of inconvenient item types. In some embodiments, the set of convenient item types may include the item types (e.g., SKUs) stored in the containers that are transported to a storage position having higher convenience metric than its previous storage position, and thus the containers storing these item types can be retrieved more conveniently. In some embodiments, the set of inconvenient item types may include the item types (e.g., SKUs) stored in the containers that are transported to a storage position having lower convenience metric than its previous storage position, and thus the containers storing these item types can be retrieved less conveniently.

In some embodiments, the data store 119 may be part of a data storage system (e.g., a standard data or database management system) for storing and providing access to data. Other types of data stored in the data store 119 are also possible and contemplated.

The inventory managing application 111 includes computer logic executable to control the AGVs and manage the containers storing inventory items in the storage facility using item identifier models (e.g., one or more predictive models). In some embodiments, the inventory managing application 111 may be implemented using software executable by one or more processors of one or more computer devices, using hardware, such as but not limited to a field-programmable gate array (FPGA), an application-specific integrated circuit (ASIC), etc., and/or a combination of hardware and software, etc. The inventory managing application 111 may receive and process the order data, the likelihood data, etc., communicate with other elements of the computing device 125 via the bus 122, and communicate with other components of the system 100 via the network 103.

In some embodiments, the inventory managing application 111 may determine one or more order likelihoods of one or more item types contained in a container. The inventory managing application 111 may determine a container utilization likelihood of the container based on the order likelihood(s) of these item type(s), and determine an optimal retrieval position (also referred to simply as an optimal position) for the container based on the container utilization likelihood of the container. An optimal retrieval position is optimized based on the container utilization likelihood for the container. The optimal retrieval position is dynamic and may change as the container utilization likelihood changes over time. The optimal nature of the position of the container is dependent on a particular point in time or timeframe associated with the likelihood, and as such, an optimal position for one point in time/timeframe may be different from the optimal position for another point in time/timeframe, as discussed elsewhere herein.

The inventory managing application 111 may then instruct the picking-AGV 107 to transport the container to the optimal position of the container. The inventory managing application 111 is described in details below with reference to at least FIGS. 2-8.

Figure 2:
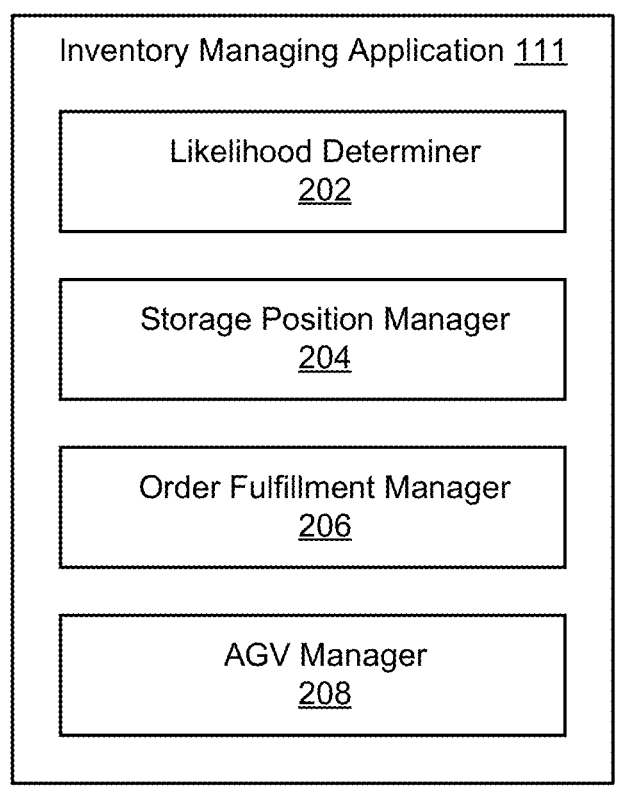
FIG. 2 is a block diagram of an example inventory managing application.

FIG. 2 is a block diagram of an example inventory managing application 111. As depicted, the inventory managing application 111 may include a likelihood determiner 202, a storage position manager 204, an order fulfillment manager 206, and an AGV manager 208. It should be understood that the inventory managing application 111 may include additional components such as, but not limited to, a configuration engine, an encryption engine, etc., and/or these various components may be combined into a single engine or divided into additional engines. In some embodiments, the inventory managing application 111 may be included in the inventory management system 105, the picking-AGVs 107, and/or the cart-AGVs 109. In some embodiments, if the inventory managing application 111 is included in the inventory management system 105, the inventory managing application 111 may be optionally configured to enable the likelihood determiner 202, the storage position manager 204, the order fulfillment manager 206, and the AGV manager 208. In some embodiments, if the inventory managing application 111 is included in picking-AGVs 107 and/or the cart-AGVs 109, the inventory managing application 111 may be optionally configured to enable the AGV manager 208, and disable other components of the inventory managing application 111.

The likelihood determiner 202, the storage position manager 204, the order fulfillment manager 206, and the AGV manager 208 may be implemented as software, hardware, or a combination of the foregoing. In some embodiments, the likelihood determiner 202, the storage position manager 204, the order fulfillment manager 206, and the AGV manager 208 may be communicatively coupled by the bus 122 and/or the processor 113 to one another and/or to the other components of the computing device 125. In some embodiments, one or more of the components 111, 202, 204, 206, and/or 208 are sets of instructions executable by the processor 113 to provide their functionality. In further embodiments, one or more of the components 111, 202, 204, 206, and/or 208 are storable in the memory 115 and are accessible and executable by the processor 113 to provide their functionality. In any of the foregoing embodiments, these components 111, 202, 204, 206, and/or 208 may be adapted for cooperation and communication with the processor 113 and other components of the computing device 125. The inventory managing application 111, and its components 202, 204, 206, and/or 208 are described in further detail below with reference to at least FIGS. 3-8.

Figure 5:
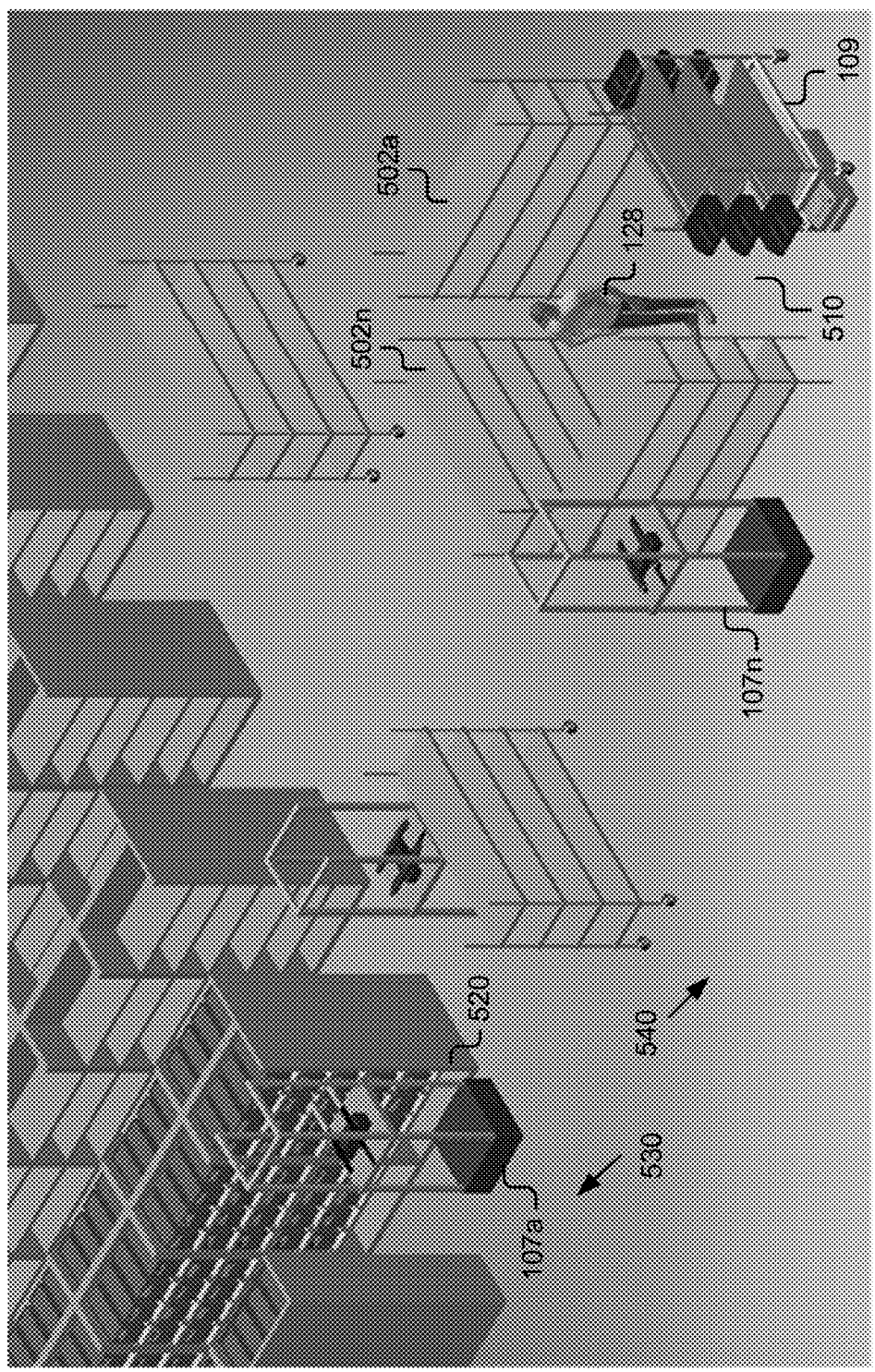
FIG. 5 illustrates an example structure of the storage facility.
Figure 6A:
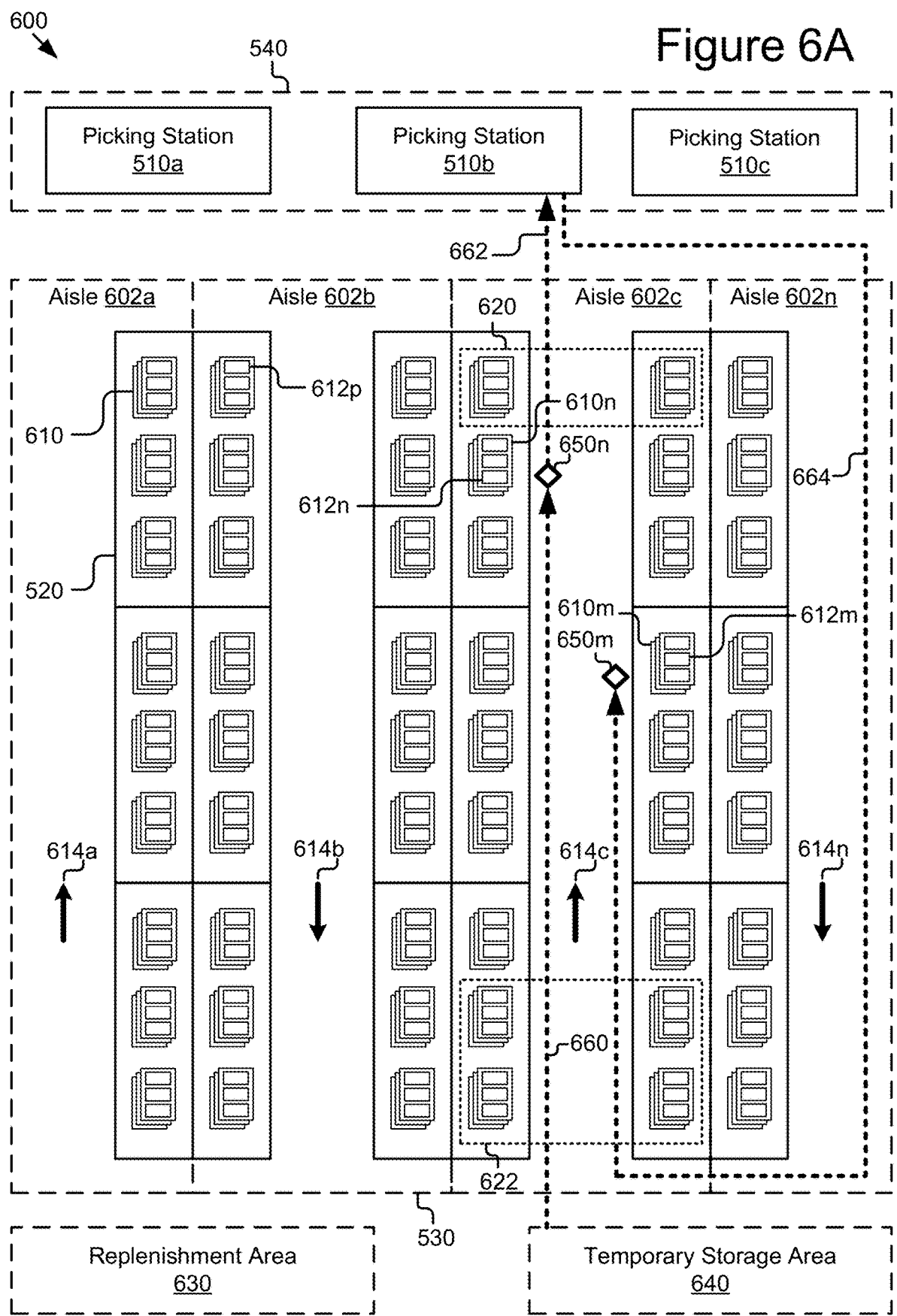
FIG. 6A illustrates an example layout structure of various physical areas in the storage facility.

As discussed elsewhere herein, the inventory managing application 111 includes computer logic executable to control the AGVs and organize containers storing inventory items in the storage facility. An example structure 500 of the storage facility is illustrated in FIG. 5 and an example layout structure 600 of various physical areas in the storage facility is illustrated in FIG. 6A. As depicted in FIG. 5, the storage facility may include a high-density storage area 530 in which the containers may usually be stored, and a pick-to-carton area 540 to which the containers may be transported to fulfill the customer orders. As depicted in FIG. 6A, the storage facility may also include a temporary storage area 640 for temporarily storing the containers that are unlikely used for order fulfillment in a future time window, a replenishment area 630 at which the containers may be replenished, etc. Other types of physical areas in the storage facility are also possible and contemplated.

As depicted in FIG. 5, the pick-to-carton area 540 may include one or more picking stations 510, the picking station 510 may include one or more pick-cells 502. In some embodiments, the pick-cell 502 may be a shelving unit for temporarily placing the containers at the picking station 510 to perform the order fulfillment. The picking station 510 may also be provided with the user device 127 for displaying the order data of various customer orders to be fulfilled. In some embodiments, in order to fulfill the customer order(s), the picking-AGV 107 may retrieve the container(s) storing the requested item types from the storage aisles in the high-density storage area 530, transport the container(s) to the picking station 510, and place the container(s) on the pick-cell(s) 502 of the picking station 510. In some embodiments, the cart-AGV 109 may transport the carton(s) to the picking station 510. The cart-AGV 109 may position itself proximate to the picking station 510 so that the carton(s) on the cart-AGV 109 are accessible to the human worker 128. The human worker 128 in the picking station 510 may pick inventory items from the containers on the pick-cells 502 according to the order data displayed on the user device 127, and place these inventory items into the corresponding carton(s) on the cart-AGV 109 to fulfill the customer order(s). Once the cartons are completed with the corresponding ordered items, the cart-AGV 109 may transport the cartons to the shipping dock for delivery.

In some embodiments, the picking station 510 may have the capacity of holding a predefined number of containers on its pick-cells 502 (e.g., 36 mini-pallets). In some embodiments, once the picking-AGV 107 transports a container to the picking station 510, the container may stay at the picking station 510 for a certain time period and may then be returned to the storage aisles in the high-density storage area 530 or transported to the temporary storage area 640. In some embodiments, the container may stay at the picking station 510 until its occupied space on the pick-cell 502 needs to be reclaimed to place another incoming container. In some embodiments, the inventory managing application 111 may determine to release the container from the picking station 510 based on the container utilization likelihood of the container in a time window (e.g., time window of 3 hours since the current timestamp). In some embodiments, the amount of time a container remains at a picking station 510 may be predetermined and/or have a certain minimum dwell time that may be extended due to dynamic conditions (e.g., new orders, etc.). As discussed elsewhere herein, the container utilization likelihood of the container in a time window may indicate the likelihood of the container being used to fulfill the customer orders in the time window.

As depicted in FIG. 6A, the high-density storage area 530 may include multiple racks 520, which may be organized to form multiple storage aisles 602. In some embodiments, each storage aisle 602 may be associated with a traffic direction 614, and the picking-AGVs 107 may travel along a given storage aisle 602 only in the traffic direction designated for it. In further embodiments, a given picking-AGVs 107 may travel along the storage aisle 602 in multiple directions at different times depending on the routes calculated for it. For example, a given picking-AGV 107 may travel down the storage aisle 602, retrieve a container, make a turn within the storage aisle 602, and then travel back up the storage aisle 602 to bring the container to a picking station 510. In some embodiments, the storage aisle 602 may include one or more rack units 610, the rack unit 610 may be a portion of the storage aisle 602 that is accessible from a predefined stop position 650. Thus, as the picking-AGV 107 makes a stop at the predefined stop position 650 associated with the rack unit 610, the picking-AGV 107 may be able to retrieve multiple containers stored in the rack unit 610 from the predefined stop position 650 in that one stop.

As depicted in FIG. 6A, each rack unit 610 of the storage aisle 602 may include one or more storage positions 612 for placing the containers. In addition to these storage positions 612 in the storage aisles 602, the storage facility may also include other storage positions in other areas of the storage facility for storing the containers (e.g., storage positions in the picking stations 510 (not shown), storage positions 642 in temporary storage area 640 (not shown), etc.). As discussed elsewhere herein, the container may be the storage unit that is retrievable and transportable by the picking-AGVs 107, and the container may store various item types. Thus, as the picking-AGVs 107 retrieve and/or transport the container between different storage positions in the storage facility, various item types contained in that container may be stored, retrieved, transported, replenished, returned, etc. together as a group.

As discussed elsewhere herein, each storage position in the storage facility may be associated with the convenience metric indicating the level of convenience to retrieve the container from the storage position. In some embodiments, the convenience metric of the storage position may be inversely proportional to the distance between the storage position and the pick-to-carton area 540. For example, as depicted in FIG. 6A, the storage aisle 602*c* may include the storage position 612*n* and the storage position 612*m*. As shown, the travel distance for the picking-AGV 107 to transport a container between the storage position 612*n* and the pick-to-carton area 540 (e.g., 1 m) may be lower than the travel distance for the picking-AGV 107 to transport a container between the storage position 612*m* and the pick-to-carton area 540 (e.g., 5 m) in the traffic direction 614*c* of the storage aisle 602*c*. Thus, in this example, the convenience metric of the storage position 612*n* (e.g., 1.0) may be higher than the convenience metric of the storage position 612*m* (e.g., 0.2).

As depicted in FIG. 6A, in some embodiments, the storage aisle 602 may include a favorable aisle portion 620 and an unfavorable aisle portion 622. The favorable aisle portion 620 is favorable in this example because it includes one or more storage positions 612 located proximate to the front end of the storage aisle 602, and is thereby closer to the pick-to-carton area 540. For instance, the front end of the storage aisle 602 may be the end position of the storage aisle 602 having the lowest distance to the pick-to-carton area 540 in the traffic direction 614 of the storage aisle 602. In some embodiments, the storage positions 612 included in the favorable aisle portion 620 may have the relative distance to the front end of the storage aisle 602 satisfying a predefined distance threshold (e.g., less than 1.5 m). The unfavorable aisle portion 622 is unfavorable in this example because it includes one or more storage positions 612 located proximate to the rear end of the storage aisle 602, and is thereby further away from the pick-to-carton area 540. The rear end of the storage aisle 602 may be the end position of the storage aisle 602 with the highest distance to the pick-to-carton area 540 in the traffic direction 614 of the storage aisle 602. In some embodiments, the storage positions 612 included in the unfavorable aisle portion 622 may have the relative distance to the rear end of the storage aisle 602 satisfying a predefined distance threshold (e.g., less than 2 m).

As depicted in FIG. 5 and FIG. 6A, the picking-AGVs 107 may autonomously retrieve and transport the containers between various storage positions in various areas of the storage facility. For example, a container may be located at the storage position 642 (not shown) in the temporary storage area 640. As illustrated in FIG. 6A, the inventory managing application 111 may determine a first container utilization likelihood of the container in a first time window, and thus instruct the picking-AGV 107 to transport the container from the temporary storage area 640 to the storage position 612*n* of the storage aisle 602*c* in the high-density storage area 530. In this example, the inventory managing application 111 may release the customer order(s) requesting the item type(s) contained in the container to the picking station 510*b* for order fulfillment. Thus, the inventory managing application 111 may instruct the picking-AGV 107 to transport the container from the storage position 612*n* in the storage aisle 602*c* to the picking station 510*b*, so that the container may be used to fulfill the customer order(s). Once the order fulfillment of the customer order(s) is completed, the inventory managing application 111 may determine a second container utilization likelihood of the container in a second time window, and thus instruct the picking-AGV 107 to release the container from the picking station 510*b*. In this example, the inventory managing application 111 may determine a third container utilization likelihood of the container in a third time window, and thus instruct the picking-AGV 107 to transport the container from the picking station 510*b* to the storage position 612*m* of the storage aisle 602*c* in the high-density storage area 530.

Figure 3:
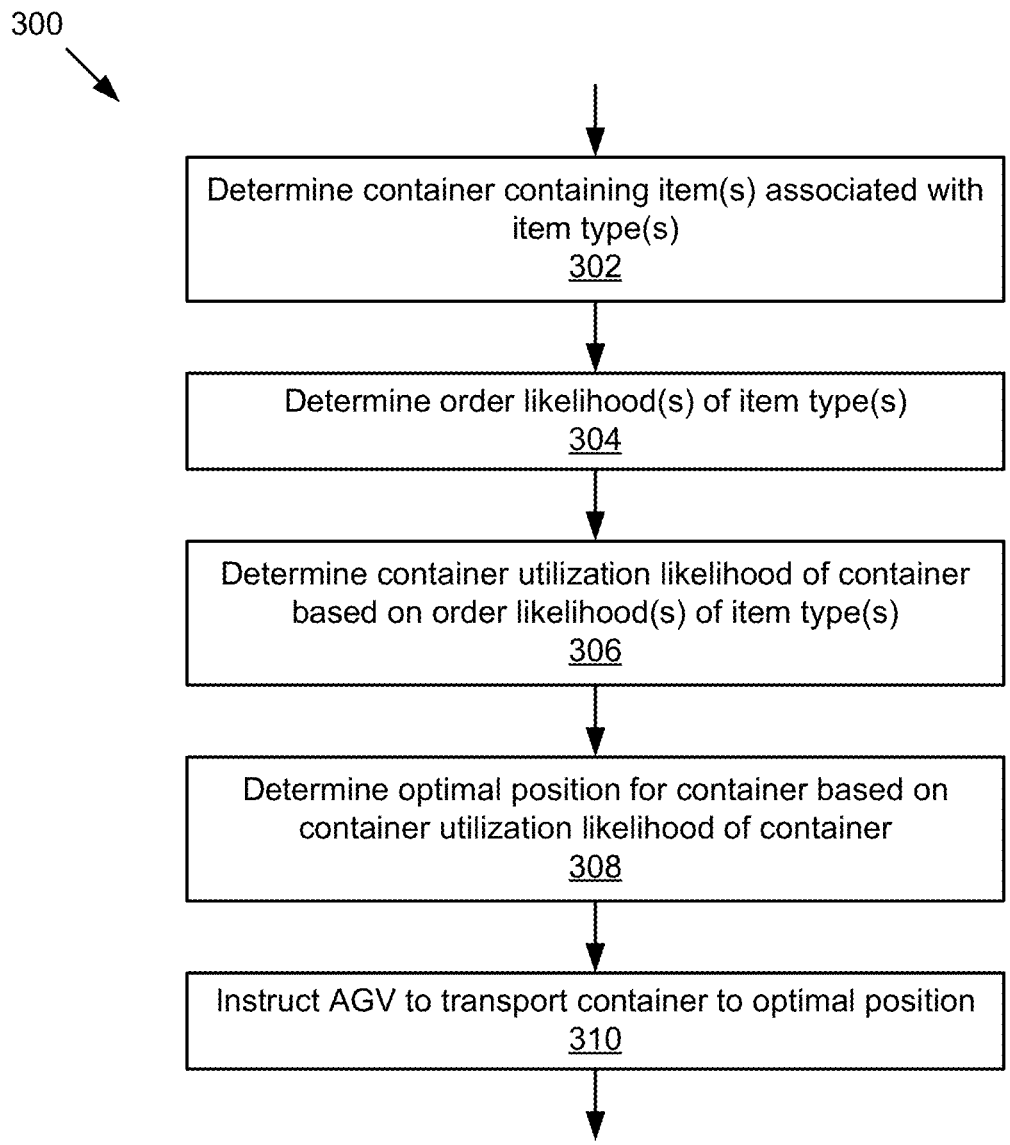
FIG. 3 is a flowchart of an example method for transporting a container to an optimal position in a storage facility.

FIG. 3 is a flowchart of an example method 300 for transporting a container to an optimal position in the storage facility. In particular, the method 300 may determine an optimal position for the container based on the container utilization likelihood of the container, and the container may then be transported to its optimal position. In block 302, the storage position manager 204 may determine a container having an opportunity to be relocated to an optimal position, the container may be located at a current position in the storage facility and may contain one or more inventory items associated with one or more item types (e.g., one or more SKUs).

In some embodiments where the circumstances provide an opportunity to move a container to a more optimal position (e.g., based on task completion status, location of AGV, whether a optimization routine is being performed, and/or queue of upcoming tasks to be completed, etc.), the storage position manager 204 may determine whether a task to be performed using a container is completed. If the storage position manager 204 determines that the task using the container is completed, the storage position manager 204 may determine that the container may be transported from its current position to an optimal position in the storage facility. For example, the container may be returned to the storage aisle 602 in the high-density storage area 530 from its current position, and thus may be transported to an optimal position in the storage aisle 602. Non-limiting examples of the task using the container include, but are not limited to, order fulfillment task to fulfill the customer orders using the item types in the container, replenishment task to replenish one or more item types in the container, etc.

In some embodiments, to determine the container having the opportunity to be relocated to the optimal position, the storage position manager 204 may determine the stop position 650 at which a picking-AGV 107 currently stops, and determine the containers located in the rack unit 610 associated with such stop position 650. As an example, the storage position manager 204 may determine that a picking-AGV 107 currently stops at a predefined stop position 650 associated with a first rack unit 610 of a storage aisle 602. Therefore, the storage position manager 204 may determine that one or more containers located in the first rack unit 610 may be transported to their optimal positions in the storage facility by the picking-AGV 107. For example, the picking-AGV 107 may transport these containers from their current positions in the first rack unit 610 of the storage aisle 602 to their optimal positions in a second rack unit 610 of the storage aisle 602.

In some embodiments, the storage facility may periodically perform optimization cycles to optimize the storage positions of the containers within the storage facility (e.g., every 2 days, every week, etc.). During the optimization cycle, the inventory managing application 111 may relocate one or more containers associated with a storage aisle 602 from their current positions to their optimal positions based on the container utilization likelihoods of these containers in a future time window (e.g., a time window of 2 days since the current timestamp). As an example, the inventory managing application 111 may instruct the picking-AGVs 107 to transport one or more containers from their storage positions 612 in the storage aisle 602 to the temporary storage area 640. The inventory managing application 111 may instruct the picking-AGVs 107 to transport one or more containers assigned to the storage aisle 602 from the temporary storage area 640 to their optimal storage positions 612 in the storage aisle 602. The inventory managing application 111 may instruct the picking-AGVs 107 to relocate one or more containers from their current storage position 612 in the storage aisle 602 to their optimal storage positions 612 in the storage aisle 602 during the optimization cycle, etc.

In some embodiments, the optimization cycle may be performed in a limited time period, therefore the inventory managing application 111 may instruct the picking-AGVs 107 to relocate only a number of containers to their optimal positions, instead of reorganizing all containers associated with the storage aisle 602. In some embodiments, among the containers associated with the storage aisle 602, the storage position manager 204 may determine one or more containers storing the item types with insufficient item velocity as the containers to be relocated during the optimization cycle. As discussed elsewhere herein, these containers may be positioned and/or relocated based on their container utilization likelihoods in a future time window. This implementation is particularly advantageous, because the containers storing the item types having insufficient item velocity may not be efficiently organized based on other factors (e.g., item affinities, order volumes, etc. of the item types stored in the container).

In some embodiments, the storage position manager 204 may determine whether the item velocities of one or more item types contained in a first container satisfy a predefined item velocity threshold (e.g., less than 50 orders/70 days). If the storage position manager 204 determines that the item velocities of the item type(s) contained in the first container satisfy the predefined item velocity threshold, the storage position manager 204 may determine that the first container may be transported from its current position to an optimal position based on its container utilization likelihood during the optimization cycle. In some embodiments, the containers storing the item types having the item velocities satisfying the predefined item velocity threshold (e.g., less than 50 orders/70 days) may be positioned and/or relocated based on their container utilization likelihoods, while other containers storing the item types having the item velocities not satisfying the predefined item velocity threshold may be positioned and/or relocated based on other factors (e.g., item affinities of the item types stored in the container).

In block 304, the likelihood determiner 202 may determine one or more order likelihoods of one or more item types contained in the container. In some embodiments, the likelihood determiner 202 may determine the one or more order likelihoods of the one or more item types in a time window, the time window may be specified by a window duration and a timestamp (e.g., time window of 2 days since the current timestamp $t=t_1=$June 19, 2018—14:30:00). In some embodiments, the likelihood determiner 202 may use a trained predictive model associated with the window duration of the time window (e.g., 2 days) to determine the order likelihoods of the item types in the time window.

Figure 4:
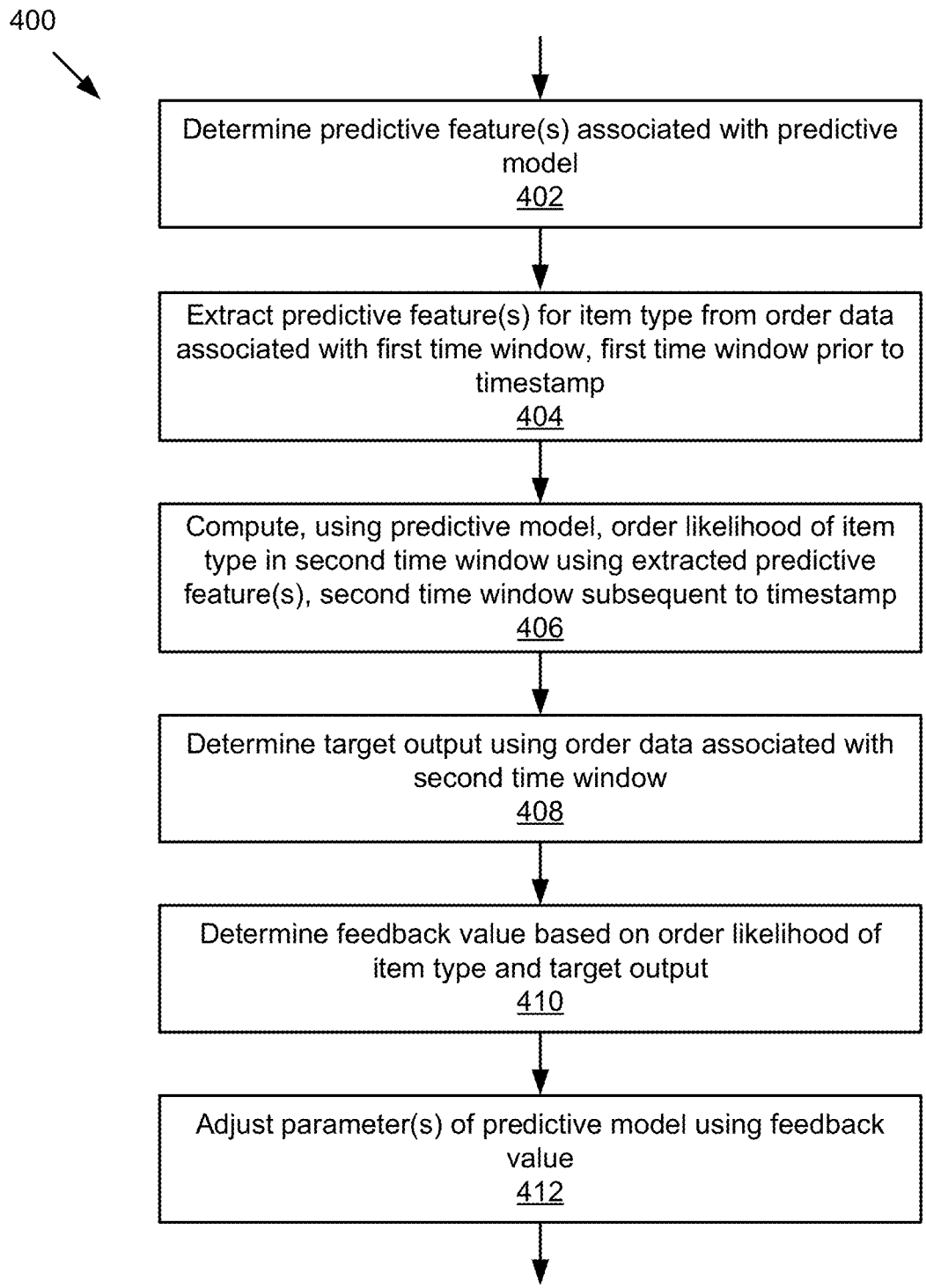
FIG. 4 is a flowchart of an example method for training a predictive model.

FIG. 4 is a flowchart of an example method 400 for training a predictive model, the predictive model may be implemented by the likelihood determiner 202. In some embodiments, the likelihood determiner 202 may implement multiple predictive models, each predictive model may be associated with a window duration (e.g., 3 hours, 2 days, 1 week, etc.). In some embodiments, the predictive model associated with a window duration may be used to predict the order likelihood of an item type in a time window specified by the window duration of the predictive model and a timestamp. In order to simplify the descriptions, the method 400 is discussed in details below with regards to the predictive model associated with the window duration of 3 hours. Other predictive models associated with other window durations may be trained in similar manner.

In block 402, the likelihood determiner 202 may determine one or more predictive features associated with the prediction model from a predefined set of predictive features. In some embodiments, the predefined set of predictive features may include the number of customer orders requesting the item type in a predefined time period (e.g., 350 orders/70 days), the number of customers requesting the item type in a predefined time period (e.g., 140 customers/70 days), the amount of time since the most recent customer order requesting the item type (e.g., 7 days), the amount of time since the most recent day with no customer order requesting the item type (e.g., 18 hours), the average time period between sequential customer orders requesting the item type (e.g., 2 days), the average time period during which there is no customer order requesting the item type (e.g., 35 hours), etc. In some embodiments, the predefined set of predictive features may also include the order deficit indicating the ratio between the number of customer orders requesting the item type have been received in a time period and the number of customer orders requesting the item type expected to receive in the time period (e.g., 35 orders/90 orders), etc.

In some embodiments, the predefined set of predictive features may include the average order quantity of the item type in a customer order (e.g., 3 boxes), the total order quantity of the item type in the most recent day during which the item type is ordered (e.g., 23 boxes), etc. In some embodiments, the predefined set of predictive features may also include the number of associated item types that have the item affinity with the item type satisfying a predefined item affinity threshold (e.g., 5 item types), the average order volume of each associated item type in a predefined time period (e.g., 400 orders/70 days), the amount of time since the most recent customer order requesting one or more associated item types (e.g., 3 days), etc. In some embodiments, the predefined set of predictive features may also include the brand name of the item type (e.g., Staples™, etc.), the category of the item type (e.g., office supplies, electronics, households, etc.), the total number of items types in the category of the item type (e.g., 1000 item types), etc. In some embodiments, the predefined set of predictive features may also include the packing unit of the item type (e.g., case, box, individual item, etc.), the number of geographical areas to which the item type may be shipped (e.g., 15 states, 10 cities, etc.), the number of channels from which the item type may be ordered (e.g., 3 retailer websites), the time of day and/or the day of week included in the time window for which the order likelihood of the item type is determined (e.g., 10 am-1 pm on Friday), etc. Other types of predictive features are also possible and contemplated.

In some embodiments, a predictive feature in the predefined set of predictive features may be used for a first prediction model associated with a first window duration, but may not be used for a second prediction model associated with a second window duration. As an example, a manufacturer A may launch a new printer every 6 months while a manufacturer B may launch a new printer every 2 years. Therefore, the predictive feature of "manufacturer" or "brand name" may be useful for determining the order likelihood of the item type in 1 year, but may not be useful for determining the order likelihood of the item type in 3 hours. Thus, in this example, the predictive feature of "manufacturer" or "brand name" may be associated with the predictive model corresponding to the window duration of 1 year, but may not be associated with the predictive model corresponding to the window duration of 3 hours.

In block 404, the likelihood determiner 202 may extract the predictive features associated with the predictive model for an item type. In some embodiments, the likelihood determiner 202 may extract these predictive features of the item type from the order data associated with a first time window prior to a timestamp. As an example, the likelihood determiner 202 may retrieve the order data associated with the first time window of 14 days prior to the timestamp $t_{timestamp}$=May 15, 2018—14:00:00. Thus, the first time window may start at t=May 1, 2018—14:00:00, and end at t=$t_{timestamp}$=May 15, 2018—14:00:00. In some embodiments, the order data associated with the first time window may describe the customer orders placed during the first time window. The likelihood determiner 202 may analyze the order data associated with the first time window, and determine the predictive features associated with the predictive model for the item type (e.g., copy paper ABC). In this example, for the predictive model associated with the window duration of 3 hours and the item type of copy paper ABC, the likelihood determiner 202 may determine the number of customer order requesting the copy paper ABC in the first time window (e.g., 65 customer orders), the average time period between sequential customer orders requesting the copy paper ABC in the first time window (e.g., 32 hours), the packing unit of the copy paper ABC (e.g., ream), etc.

In block 406, the likelihood determiner 202 may compute the order likelihood of the item type in a second time window based on the extracted predictive features using the predictive model. The second time window may be specified by the time window of the predictive model and start at the timestamp. Continuing the above example, the likelihood determiner 202 may use the predictive model associated with the window duration of 3 hours to compute the order likelihood of the copy paper ABC in the second time window of 3 hours subsequent to the timestamp $t_{timestamp}$=May 15, 2018—14:00:00. Thus, the second time window may start at t=$t_{timestamp}$=May 15, 2018—14:00:00, and end at t=May 15, 2018—17:00:00. In this example, the likelihood determiner 202 may apply the predictive model to the predictive features associated with the copy paper ABC that are extracted from the order data of the first time window as discussed above, and thus determine that the order likelihood of the copy paper ABC in the second time window is 0.35.

In block 408, the likelihood determiner 202 may determine a target output using the order data associated with the second time window. In some embodiments, the likelihood determiner 202 may analyze the order data associated with the second time window, and determine whether the item type is requested in one or more customer orders during the second time window. In some embodiments, if the item type is requested in the customer order(s) during the second time window, the likelihood determiner 202 may determine the target output to be the order likelihood of 100%. If the item type is not requested in the customer order(s) during the second time window, the likelihood determiner 202 may determine the target output to be the order likelihood of 0%. Continuing the above example, the likelihood determiner 202 may determine that the copy paper ABC is requested in 2 customer orders during the second time window of 3 hours since the timestamp $t_{timestamp}$=May 15, 2018—14:00:00. Thus, for the training sample associated with the copy paper ABC, the likelihood determiner 202 may determine the target output to be the order likelihood of 100%.

In block 408, the likelihood determiner 202 may determine a feedback value based on the order likelihood of the item type and the target output. In some embodiments, the feedback value may be the difference between the order likelihood of the item type in the second time window computed using the predictive model (e.g., 35%), and the target output determined from the order data associated with the second time window (e.g., 100%). In the above example, the likelihood determiner 202 may determine the feedback value to be 65%. In some embodiments, the likelihood determiner 202 may use a loss function, such as a logistic loss function, to determine the feedback value based on the order likelihood of the item type and the target output. Non-limiting examples of further loss functions include, but are not limited to, a square loss function, exponential loss function, etc. Other suitable functions or approaches to determine the feedback value are also possible and contemplated.

In block 410, the likelihood determiner 202 may adjust one or more parameters associated with the predictive model using the feedback value. In the above example, for the training sample associated with the copy paper ABC, the likelihood determiner 202 may use the feedback value (e.g., 65%) to adjust one or more weight factors of the predictive model associated with the window duration of 3 hours. In some embodiments, the likelihood determiner 202 may also adjust importance weights of the predictive features associated with the predictive model based on the feedback value. In some embodiments, the importance weight of a predictive feature may indicate the importance level of the predictive feature in determining the order likelihood of item types in the window duration of the predictive model. In some embodiments, the likelihood determiner 202 may remove one or more predictive features that have the importance weight satisfying a predefined importance weight threshold (e.g., less than 0.2) from the predictive features associated with the predictive model. This implementation is particularly advantageous, because it can significantly reduce the amount of computation to extract the predictive features from the order data, and to determine the order likelihood of item types using the predictive model.

In some embodiments, the likelihood determiner 202 may continuously update the predictive model using the recent order data (e.g., the order data describing the customer orders received in the last 30 days). As the predictive model may be trained based on the order data reflecting the up-to-date trend in the customer orders, the accuracy of the order likelihoods determined by the predictive model can be improved. In some embodiments, the likelihood determiner 202 may evaluate the predictive model using Area Under the Curve (AUC) metric. In some embodiments, the likelihood determiner 202 may rank the order likelihoods of one or more item types that are computed using the predictive model, and rank the target outputs associated with these one more item types. The likelihood determiner 202 may then compare the ranks of the order likelihoods computed using the predictive model with the ranks of the target outputs for these item types to determine the AUC metric indicating the quality of the predictive model. Other metrics for evaluating the predictive model are also possible and contemplated.

Referring back to FIG. 3, in block 306, the likelihood determiner 202 may determine a container utilization likelihood of the container based on one or more order likelihoods of one or more item types contained in the container. As discussed elsewhere herein, the container utilization likelihood of a container in a time window may indicate the likelihood of the container being used to fulfill the customer order(s) within the time window, because one or more item types stored in the container are requested in the customer order(s) within that time window. In some embodiments, the likelihood determiner 202 may estimate the container utilization likelihood of the container in the time window to be the maximal order likelihood among the order likelihoods of the item types contained in the container in the time window.

As an example, the container may store 3 item types: copy paper ABC, pen DEF, and pencil GHJ. The likelihood determiner 202 may use the predictive model associated with the window duration of 3 hours to determine the order likelihood of the copy paper ABC, the order likelihood of the pen DEF, and the order likelihood of the pencil GHJ in a first time window (e.g., time window of 3 hours since the current timestamp $t=t_1$=June 19, 2018—14:30:00). In this example, the likelihood determiner 202 may determine the order likelihood of the copy paper ABC in the first time window to be 0.45, the order likelihood of the pen DEF in the first time window to be 0.75, and order likelihood of the pencil GHJ in the first time window to be 0.35. Thus, the likelihood determiner 202 may determine that the order likelihood of the pen DEF in the first time window is the highest order likelihood among 3 order likelihoods of the 3 item types in the first time window. Therefore, the likelihood determiner 202 may estimate the container utilization likelihood of the container in the first time window to be the order likelihood of the pen DEF in the first time window (e.g., 0.75). This implementation is particularly advantageous, because it can avoid the massive computation to calculate the accurate container utilization likelihood of the container in the time window based on the order likelihood of the item types contained in the container, the conditional dependence indicating the likelihoods of these item types co-present in the same customer order, etc. Other implementations for estimating the container utilization likelihood of the container in the time window are also possible and contemplated.

In block 308, the storage position manager 204 may determine an optimal position for the container in the storage facility based on the container utilization likelihood of the container, the optimal position may be different from the current position of the container. In some embodiments, for each container to be relocated to an optimal position, the likelihood determiner 202 may determine multiple container utilization likelihoods of the container in multiple time windows. For example, the likelihood determiner 202 may determine a first container utilization likelihood of a first container in the first time window of 3 hours since the current timestamp $t=t_1$=June 19, 2018—14:30:00, a second container utilization likelihood of the first container in the second time window of 2 days since the current timestamp $t=t_1$, a third container utilization likelihood of the first container the third time window of 3 weeks since the current timestamp $t=t_1$, etc. In some embodiments, the storage position manager 204 may determine an optimal position for the container in the storage facility based on these multiple container utilization likelihoods of the container in these multiple time windows.

In some embodiments, the storage position manager 204 may determine an optimal area for the container in the storage facility based on one or more container utilization likelihoods of the container in one or more time windows. In some embodiments, each physical areas in the storage facility may be associated with a window duration. For example, the picking stations 510 in the pick-to-carton area 540 may be associated with a first window duration of 3 hours, the storage aisles 602 in the high-density storage area 530 may be associated with a second window duration of 2 days, the temporary storage area 640 may be associated with a third window duration of 3 weeks, etc. Other examples of various window durations associated with various physical areas in the storage facility are also possible and contemplated.

In some embodiments, the storage position manager 204 may determine whether a physical area in the storage facility is an optimal area for the container based on the container utilization likelihood of the container in a time window associated with the physical area, the time window associated with the physical area may be specified by the window duration associated with the physical area and the current timestamp. In some embodiments, the storage position manager 204 may determine whether the container utilization likelihood of the container in the time window associated with the physical area satisfies a predefined container utilization likelihood threshold (e.g., more than 0.75). If the container utilization likelihood of the container in the time window associated with the physical area satisfies the predefined container utilization likelihood threshold, the storage position manager 204 may determine the physical area to be the optimal area for the container.

For example, as depicted in FIG. 6A, the storage position manager 204 may determine that a first container assigned to the storage aisle 602c is currently located at a storage position 642 in the temporary storage area 640. In this example, the likelihood determiner 202 may determine a first container utilization likelihood of the first container in a first time window (e.g., time window of 2 days since the current timestamp $t=t_1$=June 19, 2018—14:30:00) to be 0.8. The storage position manager 204 may determine that the first container utilization likelihood of the first container in the first time window satisfies the predefined container utilization likelihood threshold (e.g., higher than 0.7), and thus determine that the first container may likely be used for order fulfillment within the first time window of 2 days since the current timestamp $t=t_1$. As a result, the storage position manager 204 may determine the optimal area for the first container at the current timestamp $t=t_1$ to be the storage aisle 602c associated with the first container in the high-density storage area 530.

In some embodiments, the storage position manager 204 may determine other containers located in the optimal area of the container. The storage position manager 204 may then determine an optimal position for the container within the optimal area based on the container utilization likelihood of the container in the time window associated with the optimal area, and other container utilization likelihoods of the other containers in the time window associated with the optimal area. Continuing the above example depicted in FIG. 6A, the storage position manager 204 may determine the optimal position for the first container in the storage aisle 602c at the current timestamp $t=t_1$.

Figure 7A:
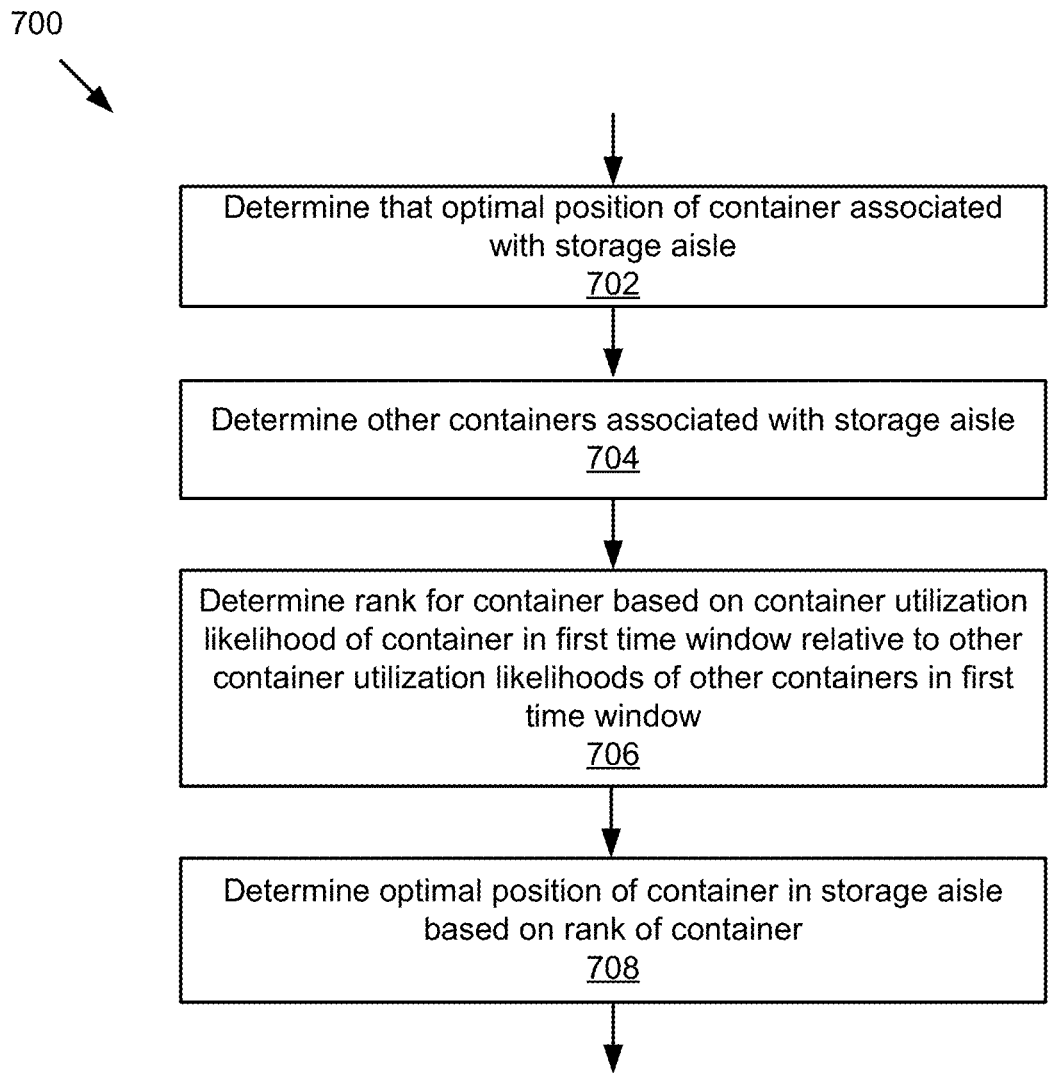
FIGS. 7A-7C illustrate flowcharts of example methods for determining the optimal position for the container in the storage facility.

FIG. 7A is a flowchart of an example method 700 for determining an optimal position for a container in a storage aisle 602. In block 702, the storage position manager 204 may determine that the optimal position of the container is associated with a storage aisle 602 in the storage facility. In the above example depicted in FIG. 6A, the storage position manager 204 may determine that the optimal area for the first container at the current timestamp $t=t_1$ is the storage aisle 602c associated with the first container in the high-density storage area 530. Thus, the optimal position of the first container at the current timestamp $t=t_1$ may be located within the storage aisle 602c to which the first container is assigned.

In block 704, the storage position manager 204 may determine other containers associated with the storage aisle 602. In some embodiments, the storage position manager 204 may determine other containers that are assigned to the storage aisle 602. Alternatively, the storage position manager 204 may determine other containers that are assigned to the storage aisle 602 and currently located within the storage aisle 602. In above example depicted in FIG. 6A, the storage position manager 204 may determine second containers that are stored in the storage aisle 602c at the current timestamp $t=t_1$.

In block 706, the storage position manager 204 may determine a rank for the container based on the container utilization likelihood of the container in a time window relative to other container utilization likelihoods of the other containers in the time window. As the optimal position of the container is associated with the storage aisle 602, the time window may be a time window associated with the storage aisle 602 (e.g., time window of 2 days since the current timestamp). In some embodiments, the storage position manager 204 may rank the container and the other containers associated with the storage aisle 602 in the decreasing order or in the increasing order of their container utilization likelihoods in the time window. Continuing the above example depicted in FIG. 6A, the likelihood determiner 202 may determine the first container utilization likelihood of the first container in the first time window (e.g., time window of 2 days since the current timestamp $t=t_1$=June 19, 2018—14:30:00) and second container utilization likelihoods of the second containers in the first time window. In this example, the storage position manager 204 may rank the first container and the second containers associated with the storage aisle 602c in the decreasing order of their container utilization likelihoods in the first time window, and thus determine the rank of the first container to be 5/1250.

In block 708, the storage position manager 204 may determine the optimal position for the container in the storage aisle 602 based on the rank of the container. In some embodiments, the storage position manager 204 may determine the optimal position for the container in the storage aisle 602 to be the storage position 612 in the storage aisle 602 that has the distance to the pick-to-carton area 540 proportional to the rank of the container. As discussed above, the storage position manager 204 may rank the container and the other containers associated with the storage aisle 602 in the decreasing order or in the increasing order of their container utilization likelihoods in the time window. Thus, in some embodiments, the optimal position for the container in the storage aisle 602 may be the storage position 612 in the storage aisle 602 that has the distance to the pick-to-carton area 540 directly proportional or inversely proportional to the rank of the container, respectively.

Continuing the above example depicted in FIG. 6A, the storage position manager 204 may determine the rank of the first container to be 5/1250, and thus determine the optimal position for the first container in the storage aisle 602c to be the fifth storage position 612 having the fifth lowest distance to the front end of the storage aisle 602c. In some embodiments, if the fifth storage position 612 of the storage aisle 602c is occupied by another container, the storage position manager 204 may determine the optimal position for the first container to be the unoccupied storage position 612 having the lowest distance to the fifth storage position 612 in the storage aisle 602c. As depicted in FIG. 6A, in this example, the storage position manager 204 may determine the optimal position for the first container to be the storage position 612n in the storage aisle 602c.

In some embodiments, the storage position manager 204 may determine whether the rank of the container satisfies a first predefined container rank threshold (e.g., lower than 100). If the storage position manager 204 determines that the rank of the container satisfies the first predefined container rank threshold, the storage position manager 204 may determine the optimal position for the container to be an unoccupied storage position 612 in the favorable aisle portion 620 of the storage aisle 602. In some embodiments, the storage position manager 204 may determine whether the rank of the container satisfies a second predefined container rank threshold (e.g., higher than 1000). If the storage position manager 204 determines that the rank of the container satisfies the second predefined container rank threshold, the storage position manager 204 may determine the optimal position for the container to be an unoccupied storage position 612 in the unfavorable aisle portion 622 of the storage aisle 602.

Referring back to FIG. 3, in block 310, the AGV manager 208 may instruct an automated guided vehicle (AGV) to transport the container from the current position of the container to the optimal position of the container in the storage facility. In some embodiments, the AGV manager 208 may receive the instruction to transport the container from the current position of the container to the optimal position of the container from the storage position manager 204. In the above example depicted in FIG. 6A, the current position of the first container may be a storage position 642 in the temporary storage area 640, and the optimal position of the first container may be the storage position 612n in the storage aisle 602c. As discussed above, the storage position manager 204 may determine the storage position 612n in the storage aisle 602c to be the optimal position for the first container based on the first container utilization likelihood of the first container in the first time window (e.g., time window of 2 days since the current timestamp $t=t_1$=June 19, 2018—14:30:00).

In some embodiments, the AGV manager 208 may instruct a picking-AGV 107 to move to the current position of the container. In the above example depicted in FIG. 6A, the AGV manager 208 may instruct a picking-AGV 107 to relocate to the storage position 642 of the first container in the temporary storage area 640. Once the picking-AGV 107 arrives at the storage position 642 of the first container, the picking-AGV 107 may scan the graphic position marker attached to the storage position 642 to obtain the storage position ID of the storage position 642, and send the storage position ID of the storage position 642 to the AGV manager 208.

In some embodiments, the AGV manager 208 may receive an input identifying the current position of the container from the picking-AGV 107. Responsive to receiving the input identifying the current position of the container from the picking-AGV 107, the AGV manager 208 may determine that the picking-AGV 107 arrives at the current position of the container. Thus, the AGV manager 208 may instruct the picking-AGV 107 to retrieve the container from the current position of the container and then move to the optimal position of the container. Continuing the above example depicted in FIG. 6A, responsive to receiving the storage position ID of the storage position 642 from the picking-AGV 107, the AGV manager 208 may instruct the picking-AGV 107 to retrieve the first container from the storage position 642 and move to the storage position 612n in the storage aisle 602c. Accordingly, the picking-AGV 107 may retrieve the first container from the storage position 642 and place the first container on its container holder using its container handling mechanism. The picking-AGV 107 may then relocate to the storage position 612n in the storage aisle 602c as indicated by the travel path 660 in FIG. 6A. Once the picking-AGV 107 arrives at the storage position 612n in the storage aisle 602c, the picking-AGV 107 may scan the graphic position marker attached to the storage position 612n to obtain the storage position ID of the storage position 612n, and send the storage position ID of the storage position 612n to the AGV manager 208.

In some embodiments, the AGV manager 208 may receive an input identifying the optimal position of the container from the picking-AGV 107. Responsive to receiving the input identifying the optimal position of the container from the picking-AGV 107, the AGV manager 208 may determine that the picking-AGV 107 arrives at the optimal position of the container, and thus instruct the picking-AGV 107 to place the container at the optimal position of the container. Continuing the above example depicted in FIG. 6A, responsive to receiving the storage position ID of the storage position 612n in the storage aisle 602c from the picking-AGV 107, the AGV manager 208 may instruct the picking-AGV 107 to place the first container at the storage position 612n. Accordingly, the picking-AGV 107 may retrieve the first container from its container holder, and place the first container at the storage position 612n in the storage aisle 602c using its container handling mechanism. The picking-AGV 107 may then send to the AGV manager 208 and/or the storage position manager 204 a task complete notification indicating that the transportation of the first container from the storage position 642 in the temporary storage area 640 to the storage position 612n in the storage aisle 602c is completed.

In some embodiments, the AGV manager 208 and/or the storage position manager 204 may receive the task complete notification from the picking-AGV 107. Responsive to receiving the task complete notification, the storage position manager 204 may update the storage position map in the data store 119 accordingly. In the above example depicted in FIG. 6A, the storage position manager 204 may update the current position of the first container to be the storage position 612n of the storage aisle 602c, and update the storage position 642 in the temporary storage area 640 to be an unoccupied storage position in the storage position map.

In some embodiments, the storage position manager 204 may also update the set of convenient item types and/or the set of inconvenient item types in the data store 119. In some embodiments, the storage position manager 204 may determine whether the convenience metric of the optimal position to which the container is transported is higher than the convenience metric of the storage position from which the container is transported. If the convenience metric of the optimal position to which the container is transported is higher than the convenience metric of the storage position from which the container is transported, the storage position manager 204 may determine that the item types contained in the container may now be retrieved more conveniently due to the relocation of the container, and thus add these item types to the set of convenient item types. Otherwise, the storage position manager 204 may determine that the item types contained in the container may now be retrieved less conveniently due to the relocation of the container, and thus add these item types to the set of inconvenient item types. In the above example depicted in FIG. 6A, the first container may contain 3 item types (e.g., copy paper ABC, pen DEF, and pencil GHJ), and the storage position 612n in the storage aisle 602c to which the first container is transported may have the higher convenience metric than the storage position 642 in the temporary storage area 640 from which the first container is transported. Thus, the storage position manager 204 may update the set of convenient item types to include the 3 item types stored in the first container.

Thus, as discussed above, the storage position manager 204 may rank the container and other containers associated with the storage aisle 602 based on their container utilization likelihoods in the time window associated with the storage aisle 602 (e.g., time window of 2 days since the current timestamp), and determine the optimal position for the container in the storage aisle 602 based on the rank of the container. As a result, if the container has the container utilization likelihood relatively high as compared to the other containers in the storage aisle 602, the optimal position of the container in the storage aisle 602 may be relatively close to the pick-to-carton area 540 as compared to the other containers. On the other hand, if the container has the container utilization likelihood relatively low as compared to the other containers in the storage aisle 602, the optimal position of the container in the storage aisle 602 may be relatively far away from the pick-to-carton area 540 as compared to the other containers. This implementation is particularly advantageous. As the containers that are likely needed to fulfill the customer orders in the time window (e.g., time window of 2 days since the current timestamp) may be relocated closer to the pick-to-carton area 540 in advance, the travel distance and the travel time for the picking-AGV 107 to transport these containers to the picking stations 510 in the pick-to-carton area 540 when needed can be significantly reduced, thereby expediting the order fulfillment process.

Figure 8:
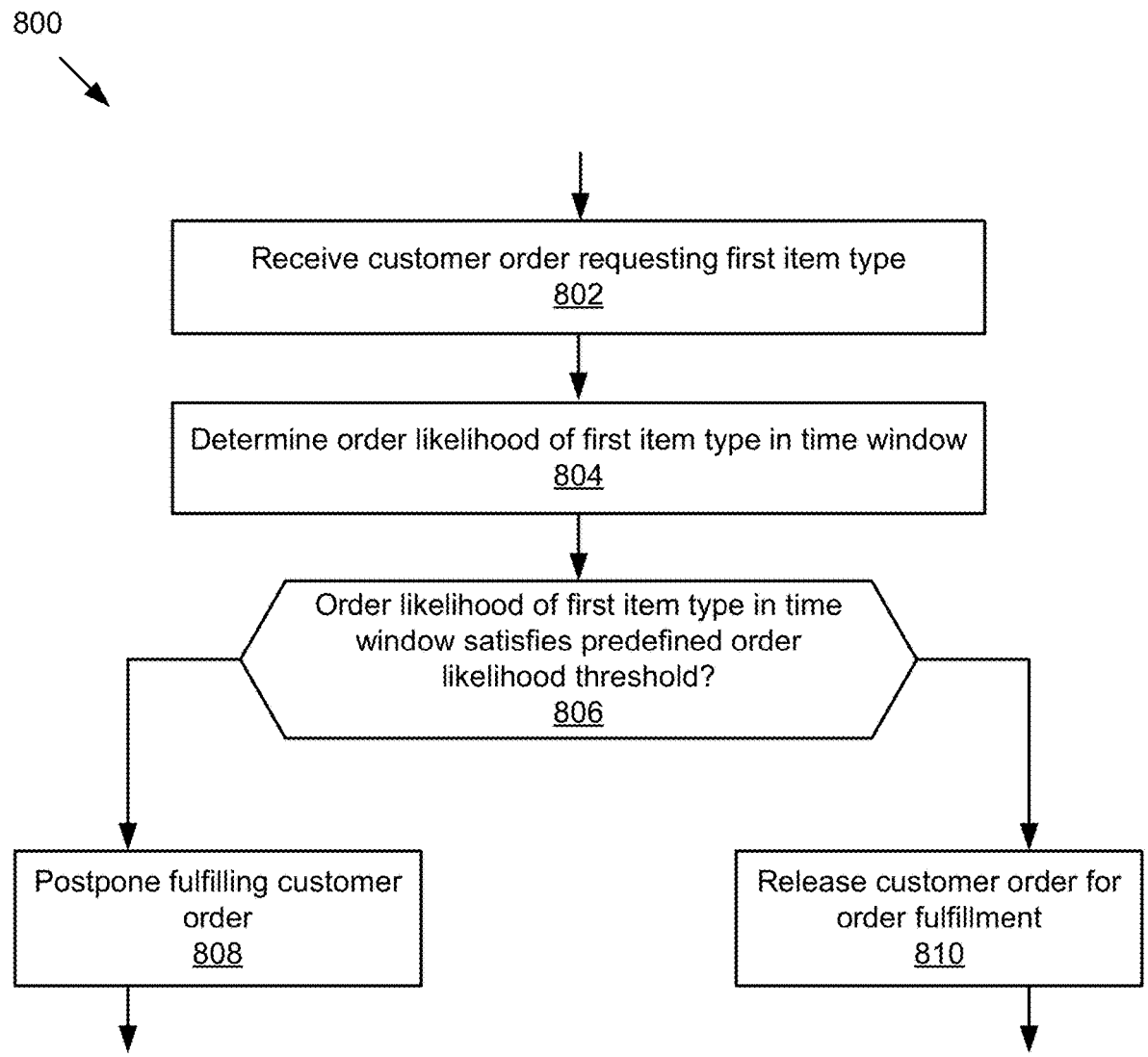
FIG. 8 is a flowchart of an example method for managing the distribution of a customer order to a picking station for order fulfillment.

As discussed elsewhere herein, in the order fulfillment process, the order fulfillment manager 206 may release each customer order to a picking station 510 to be fulfilled, and instruct the picking-AGV 107 to transport the container(s) that store the item type(s) requested in the customer order to the picking station 510. FIG. 8 is a flowchart of an example method 800 for managing the distribution of customer orders to the picking stations 510 for order fulfillment. In block 802, the order fulfillment manager 206 may receive a customer order requesting a first item type. Continuing the above example depicted in FIG. 6A, the order fulfillment manager 206 may receive a customer order requesting the item type of copy paper ABC contained in the first container. In block 804, the likelihood determiner 202 may determine the first order likelihood of the first item type in a time window, the time window may be specified by a predefined window duration (e.g., 2 hours) and the current timestamp. In the above example depicted in FIG. 6A, the likelihood determiner 202 may use the predictive model associated with the window duration of 2 hours, and determine the order likelihood of the copy paper ABC in a second time window (e.g., time window of 2 hours since the current timestamp t=$t_2$=June 19, 2018—16:00:00) to be 0.8.

In block 806, the order fulfillment manager 206 may determine whether the first order likelihood of the first item type in the time window satisfies a predefined order likelihood threshold (e.g., higher than 0.75). If in block 806, the order fulfillment manager 206 determines that the first order likelihood of the first item type in the time window satisfies the predefined order likelihood threshold, the order fulfillment manager 206 may determine that the first item type is likely requested in other customer order(s) in that future time window. The method 800 may then proceed to block 808.

In block 808, the order fulfillment manager 206 may postpone the fulfillment of the customer order. In some embodiments, the order fulfillment manager 206 may maintain the customer order in an order queue during the time window to wait for other customer order(s) that may also request the first item type. In some embodiments, at the end of the time window, the order fulfillment manager 206 may release the customer order together with the other customer order(s) requesting the first item type to the same picking station 510. This implementation is particularly advantageous, because each time the container storing the first item type is transported to the picking station 510, such container may be used to fulfill multiple customer orders that are released to the picking station 510 at the same time, thereby improving the efficiency of the order fulfillment process. In the above example depicted in FIG. 6A, as the order likelihood of the copy paper ABC in the second time window (e.g., 0.8) satisfies the predefined order likelihood threshold (e.g., higher than 0.75), the order fulfillment manager 206 may postpone the fulfillment of the customer order. In this example, the order fulfillment manager 206 may release the customer order and other customer orders requesting the copy paper ABC received during the second time window (if any) to the picking station 510b at the end of the second time window (e.g., time window of 2 hours since the current timestamp t=$t_2$=June 19, 2018—16:00:00).

If in block 806, the order fulfillment manager 206 determines that the first order likelihood of the first item type in the time window does not satisfy the predefined order likelihood threshold, the order fulfillment manager 206 may determine that the first item type is unlikely requested in another customer order in that future time window. The method 800 may then proceed to block 810. In block 810, the order fulfillment manager 206 may release the customer order for order fulfillment. In some embodiments, the order fulfillment manager 206 may release the customer order to the picking station 510 to which the first item type is assigned to be fulfilled.

In some embodiments, responsive to releasing the customer order requesting the item type to the picking station 510 to be fulfilled, the order fulfillment manager 206 may send to the AGV manager 208 an instruction to transport the container storing the item type from the storage aisle 602 to the picking station 510. As discussed elsewhere herein, the container may be transported from its current position to the optimal position 612 in the storage aisle 602 in advance, with the optimal position 612 of the container may be determined based on the container utilization likelihood of the container in the time window associated with the storage aisle 602. The storage position manager 204 may then update the current position of the container to be this optimal position 612 in the storage aisle 602. Thus, responsive to receiving the instruction to transport the container to the picking station 510, the AGV manager 208 may instruct the picking-AGV 107 to transport the container from the updated current position of the container (e.g., the optimal position 612 in the storage aisle 602) to the picking station 510.

Continuing the above example depicted in FIG. 6A, as the order fulfillment manager 206 releases the customer order requesting the copy paper ABC to the picking station 510b to be fulfilled, the AGV manager 208 may instruct the picking-AGV 107 to transport the first container storing the copy paper ABC to the picking station 510b. As discussed above, in this example, the first container may be transported from the temporary storage area 640 to its optimal position 612n in the storage aisle 602c. Thus, the AGV manager 208 may instruct the picking-AGV 107 to relocate to this updated current position of the first container (e.g., the optimal position 612n in the storage aisle 602c), retrieve the first container from the optimal position 612n in the storage aisle 602c, relocate to the picking station 510b as indicated by the travel path 662 in FIG. 6A, and place the first container on a pick-cell 502 of the picking station 510b.

In some embodiments, as the picking-AGV 107 transports the container storing the item type requested in the customer order to the picking station 510, the AGV manager 208 may also instruct the cart-AGV to collaboratively transport a shipping box associated with the customer order (e.g., a carton) to the picking station 510. As a result, the container storing the item type requested in the customer order and the shipping box associated with the customer order may be present at the picking station 510 at relatively the same time. Thus, the human worker 128 may pick the inventory item(s) of the item type from the container, and place these inventory item(s) into the corresponding shipping box to fulfill the customer order with limited waiting time, thereby expediting the order fulfillment process.

In some embodiments, once the customer orders requesting the item type(s) contained in the container is fulfilled, the storage position manager 204 may determine that order fulfillment task using the container is completed, and thus the container has an opportunity to be relocated from its current position in the picking station 510 to an optimal position in the storage facility. In some embodiments, the likelihood determiner 202 may determine multiple container utilization likelihoods of the container in multiple time windows. For example, the likelihood determiner 202 may determine a first container utilization likelihood of the container in a first time window associated with the storage aisles 602 in the high-density storage area 530 (e.g., time window of 2 days since the current timestamp), a second container utilization likelihood of the container in a second time window associated with the temporary storage area 640 (e.g., time window of 3 weeks since the current timestamp), a third container utilization likelihood of the container in a third time window associated with the picking stations 510 in the pick-to-carton area 540 (e.g., time window of 3 hours since the current timestamp), etc. In some embodiments, the storage position manager 204 may determine an optimal area for the container in the storage facility, and determine an optimal position for the container within the optimal area based on these multiple container utilization likelihoods of the container in these multiple time windows.

In some embodiments, the storage position manager 204 may determine whether the first container utilization likelihood of the container in the first time window (e.g., time window of 2 days since the current timestamp) satisfies a predefined container utilization likelihood threshold (e.g., higher than 0.8). If the first container utilization likelihood of the container in the first time window satisfies the predefined container utilization likelihood threshold, the storage position manager 204 may determine the optimal area for the container at the current timestamp to be the storage aisle 602 to which the container is assigned in the high-density storage area 530. In some embodiments, the storage position manager 204 may then determine the optimal position 612 for the container at the current timestamp in the storage aisle 602. In some embodiments, the optimal position 612 in the storage aisle 602 for the container at the current timestamp may be determined in a manner similar to the method 700 described above with reference to FIG. 7A, and thus not repeated again for brevity.

Continuing the above example depicted in FIG. 6A, once the customer order(s) requesting the item type(s) stored in first container are fulfilled at the picking station 510b, the storage position manager 204 may determine the optimal position in the storage facility for the first container at the current timestamp $t=t_3$=June 19, 2018—17:30:00. In this example, for a first scenario, the storage position manager 204 may determine the optimal area for the first container at the current timestamp $t=t_3$ to be the storage aisle 602c associated with the first container in the high-density storage area 530. The storage position manager 204 may also determine the optimal position for the first container in the storage aisle 602c at the current timestamp $t=t_3$ to be the storage position 612m. The storage position manager 204 may then send to the AGV manager 208 an instruction to transport the first container from the picking station 510b to the optimal position 612m in the storage aisle 602c. Responsive to receiving this instruction, the AGV manager 208 may instruct the picking-AGV 107 to relocate to the picking station 510b, retrieve the first container from the pick-cell 502 of the picking station 510b, relocate to the optimal position 612m in the storage aisle 602c as indicated by the travel path 664 in FIG. 6A, and place the first container at the optimal position 612m in the storage aisle 602c.

As depicted in FIG. 6A, the optimal position of the first container to which the first container is transported from the picking station 510b at the current timestamp $t=t_3$=June 19, 2018—17:30:00 (e.g., the storage position 612m in the storage aisle 602c) may be different from the optimal position of the first container from which the first container is transported to the picking station 510b at the timestamp $t=t_1$=June 19, 2018—14:30:00 (e.g., the storage position 612n in the storage aisle 602c). This is because the container utilization likelihoods of the containers (e.g., the first container and other containers associated with the storage aisle 602c) in the time window of 2 hours since the current timestamp $t=t_3$ may be different from the container utilization likelihoods of these containers in the time window of 2 hours since the timestamp $t=t_1$. As a result, the rank of the first container based on these container utilization likelihoods may change over time, and thus causing the difference in the optimal position for the first container at different timestamps.

Figure 7B:
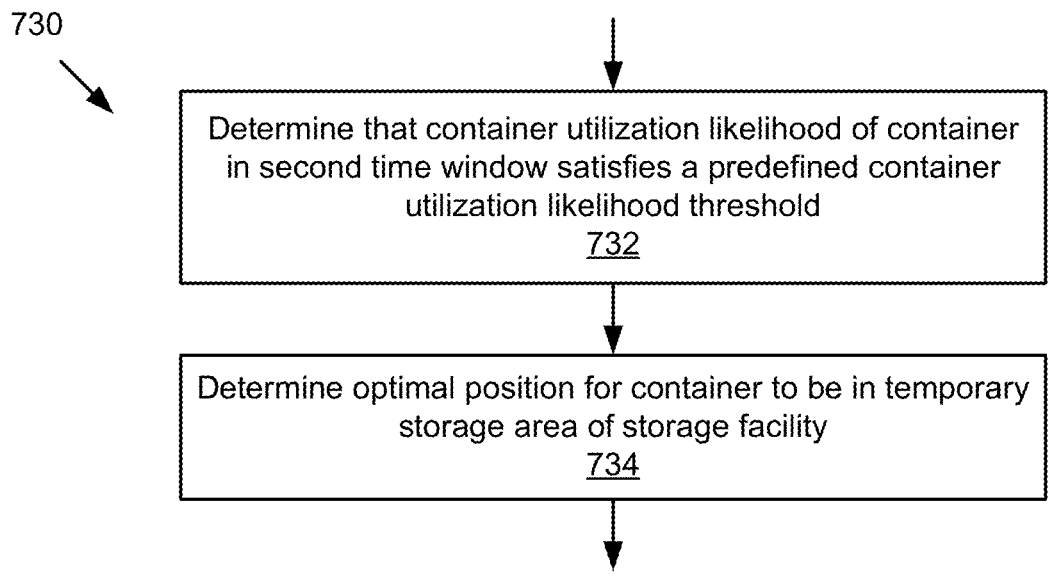

FIG. 7B is a flowchart of an example method 730 for determining the optimal position for the container, the optimal position of the container may be in the temporary storage area 640 of the storage facility. In block 732, the storage position manager 204 may determine whether the second container utilization likelihood of the container in the second time window (e.g., time window of 3 weeks since the current timestamp) discussed above satisfies a predefined container utilization likelihood threshold (e.g., higher than 0.85). If the second container utilization likelihood of the container in the second time window satisfies the predefined container utilization likelihood threshold, in block 734, the storage position manager 204 may determine the optimal area for the container at the current timestamp to be the temporary storage area 640, and thus the optimal position for the container may be located in the temporary storage area 640 of the storage facility.

In some embodiments, the storage position manager 204 may then determine the optimal position 642 in the temporary storage area 640 for the container at the current timestamp. In some embodiments, the optimal position 642 in the temporary storage area 640 for the container at the current timestamp may be determined in a manner similar to the method 700 described above with reference to FIG. 7A. For example, in some embodiments, the storage position manager 204 may determine other containers that are stored in the temporary storage area 640 at the current timestamp. The storage position manager 204 may determine a rank for the container based on the container utilization likelihood of the container in a time window relative to other container utilization likelihoods of the other containers in the time window, the time window may be a time window associated with the temporary storage area 640 (e.g., time window of 3 weeks since the current timestamp). The storage position manager 204 may then determine the optimal position for the container in the temporary storage area 640 based on the rank of the container. For example, the storage position manager 204 may determine the optimal position for the container to be the storage position 642 in the temporary storage area 640 that has the distance to the high-density storage area 530 directly proportional or inversely proportional to the rank of the container.

Continuing the above example depicted in FIG. 6A, once the customer order(s) requesting the item type(s) stored in first container are fulfilled at the picking station 510b, the storage position manager 204 may determine the optimal position in the storage facility for the first container at the current timestamp $t=t_3$=June 19, 2018—17:30:00. In this example, for a second scenario, the storage position manager 204 may determine the optimal area for the first container at the current timestamp $t=t_3$ to be the temporary storage area 640, and the optimal position for the first container in the temporary storage area 640 at the current timestamp $t=t_3$ to be a storage position 642 in the temporary storage area 640. The storage position manager 204 may then send to the AGV manager 208 an instruction to transport the first container from the picking station 510b to the optimal position 642 in the temporary storage area 640. Responsive to receiving this instruction, the AGV manager 208 may instruct the picking-AGV 107 to relocate to the picking station 510b, retrieve the first container from the pick-cell 502 of the picking station 510b, relocate to the optimal position 642 in the temporary storage area 640, and place the first container at the optimal position 642 in the temporary storage area 640.

Figure 7C:
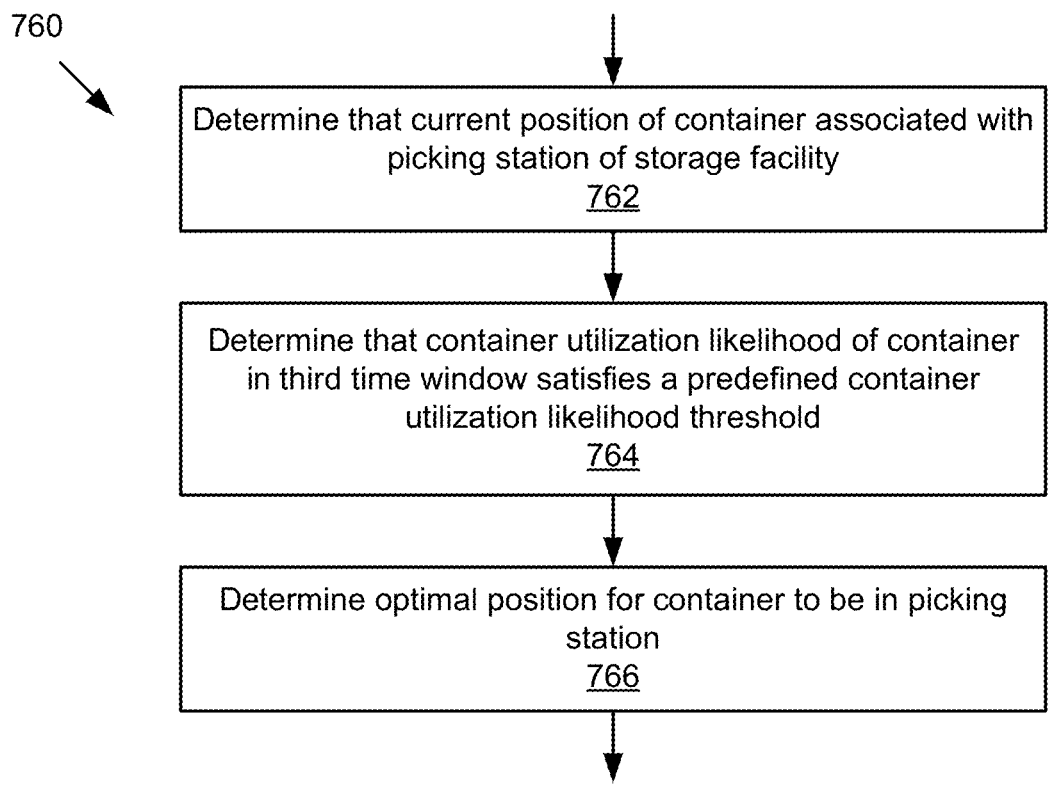

FIG. 7C is a flowchart of an example method 760 for determining the optimal position for the container, the optimal position of the container may be in the pick-to-carton area 540 of the storage facility. In block 762, the storage position manager 204 may determine that the current position of the container is associated with a picking station 510 in the pick-to-carton area 540. For example, the storage position manager 204 may determine that the container is currently located at the picking station 510 and the order fulfillment task to be performed using the container is completed. In block 764, the storage position manager 204 may determine whether the third container utilization likelihood of the container in the third time window (e.g., time window of 3 hours since the current timestamp) discussed above satisfies a predefined container utilization likelihood threshold (e.g., higher than 0.75). If the third container utilization likelihood of the container in the third time window satisfies the predefined container utilization likelihood threshold, in block 766, the storage position manager 204 may determine that the container may likely be used again for order fulfillment within the third time window (e.g., time window of 3 hours since the current timestamp), and thus determine the optimal position for the container to be in the picking station 510. In some embodiments, the storage position manager 204 may maintain the container at the picking station 510 during the third time window. This implementation is particularly advantageous, because other customer order(s) requesting the item types stored in the container that are likely received in the third time window may be fulfilled at the picking station 510, without the picking-AGV 107 transporting the container to and from the picking station 510 multiple times.

As discussed elsewhere herein, the containers may have an opportunity to be relocated to the optimal positions in the storage facility during the optimization cycles. The storage facility may perform the optimization cycles periodically to optimize the storage positions of the containers within the storage facility (e.g., every 10 hours, every day, etc.). In some embodiments, during an optimization cycle, the storage position manager 204 may determine one or more containers associated with a storage aisle 602 (e.g., the containers storing the item types that have item velocity satisfying a predefined item velocity threshold), and determine optimal positions for these containers. The AGV manager 208 may then instruct the picking-AGVs 107 to transport these containers from their current positions to the optimal positions in the storage facility.

As an example, during the optimization cycle, the storage position manager 204 may determine a first container currently located at a storage position 612*a* in the storage aisle 602, and determine an optimal position for the first container to be a storage position 612*b* in the storage aisle 602 based on a first container utilization likelihood of the first container in a first time window (e.g., time window of 3 hours since the current timestamp). In some embodiments, the storage position 612*b* in the storage aisle 602 optimal for the first container may be different from the storage position 612*a* in the storage aisle 602 at which the first container is currently located. For example, if the container utilization likelihood of the first container in the first time window is relatively high as compared to other container utilization likelihoods of other containers associated with the storage aisle 602 in the first time window, the storage position 612*b* optimal for the first container may have a lower distance to the front end of the storage aisle 602 than the current position 612*a* of the first container and vice versa. In this example, the optimal position 612*b* for the first container and the current position 612*a* of the first container may be in the same physical area of the storage facility (e.g., the storage aisle 602 in the high-density storage area 530). In some embodiments, the storage position 612*b* in the storage aisle 602 optimal for the first container may be determined in a manner similar to the method 700 described above with reference to FIG. 7A.

As another example, during the optimization cycle, the storage position manager 204 may determine a second container currently located at a storage position 612*c* in the storage aisle 602, and determine an optimal position for the second container to be the storage position 642*a* in the temporary storage area 640 based on a second container utilization likelihood of the second container in a second time window (e.g., time window of 3 weeks since the current timestamp). Thus, in this example, the optimal position 642*a* for the second container and the current position 612*c* of the second container may be in different physical areas of the storage facility. In some embodiments, the storage position 642*a* in the temporary storage area 640 optimal for the second container may be determined in a manner similar to the method 730 described above with reference to FIG. 7B.

As another example, during the optimization cycle, the storage position manager 204 may determine a third container associated with the storage aisle 602 and currently located at the storage position 642*b* in the temporary storage area 640. The storage position manager 204 may determine an optimal position for the third container to be the storage position 612*c* in the storage aisle 602 based on a third container utilization likelihood of the third container in the first time window (e.g., time window of 3 hours since the current timestamp). Thus, in this example, the optimal position 612*c* for the third container and the current position 642*b* of the third container may be in different physical areas of the storage facility, and the optimal position 612*c* for the third container may be the previous position of the second container which is now transported to the storage position 642*a* in the temporary storage area 640. In some embodiments, the storage position 612*c* in the storage aisle 602 optimal for the third container may be determined in a manner similar to the method 700 described above with reference to FIG. 7A.

In some embodiments, during the optimization cycle, the storage position manager 204 may determine the optimal positions for the containers storing one or more item types that have the order likelihoods in a time window (e.g., time window of 2 days since the current timestamp) relatively high as compared to the order likelihoods in such time window of other item types. In some embodiments, the storage position manager 204 may load balance the containers by allocating them in optimal positions across multiple storage aisles 602. For example, in some embodiments, the likelihood determiner 202 may determine one or more likely-ordered item types, each likely-ordered item type may have the order likelihood in the time window associated with the storage aisle 602 (e.g., time window of 2 days since the current timestamp) satisfying a predefined order likelihood threshold (e.g., higher than 75%). Thus, it is highly likely that these item types may be requested in the customer orders within the time window.

In some embodiments, the likelihood determiner 202 may aggregate the likely-ordered item types into a predefined number of groups based on the item velocity of the likely-ordered item types. In some embodiments, the number of groups may equal to the number of storage aisles 602 in the storage facility. In some embodiments, the likelihood determiner 202 may compute the target number of likely-ordered item types for each group by dividing the total number of likely-ordered item types by the number of group (e.g., 15 item types). In some embodiments, the likelihood determiner 202 may compute the total item velocity of the likely-ordered item types, and compute the target total item velocity for each group by dividing the total item velocity of the likely-ordered item types by the number of group (e.g., 1250 orders/50 days).

In some embodiments, the likelihood determiner 202 may then aggregate the likely-ordered item types into one or more groups of likely-ordered item types based on the target number of likely-ordered item types for each group and the target total item velocity for each group. For example, the likelihood determiner 202 may assign each likely-ordered item type to a group of likely-ordered item types such that the number of likely-ordered item types included in the group may substantially equal to the target number of likely-ordered item types for each group (e.g., the difference between these two values may satisfies a predefined count difference threshold, e.g., less than 2 item types), and the total item velocity of the likely-ordered item types included in the group may substantially equal to the target total item velocity for each group (e.g., the difference between these two values may satisfies a predefined velocity difference threshold, e.g., less than 12 orders/50 days). Thus, each group may include substantially the same number of likely-ordered item types and may have substantially the same total item velocity of the likely-ordered item types included in the group. As a result, each group may have substantially the same customer demand for the likely-ordered item types included in the group. Other implementations for aggregating the likely-ordered item types into one or more groups are also possible and contemplated.

In some embodiments, the storage position manager 204 may assign each group of likely-ordered item types to a storage aisle 602. For example, the storage position manager 204 may assign the group of likely-ordered item types including the copy paper ABC, pen DEF, and eraser KLM to the storage aisle 602c. In some embodiments, the storage position manager 204 may determine the optimal positions for the containers that store one or more likely-ordered item types in the group to be the storage positions 612 located proximate to the front end of the storage aisle 602. In some embodiments, the storage position manager 204 may also determine the storage positions 612 optimal for these containers to be proximate to one another. As an example, the storage position manager 204 may determine the optimal position for a first container storing the copy paper ABC and pen DEF, and the optimal position for a second container storing the eraser KLM to be the storage positions 612 that have the distance to the front end of the storage aisle 602 satisfying a first predefined distance threshold (e.g., less than 3 m), and have the distance between one another satisfying a second predefined distance threshold (e.g., less than 0.5 m). In another example, the storage position manager 204 may determine the optimal position 612 for the first container and the optimal position 612 for the second container to be both in the favorable aisle portion 620 of the storage aisle 602c.

Thus, as discussed above, the storage position manager 204 may determine the optimal positions for the containers storing the likely-ordered item types proximate to one another and proximate to the front end of the storage aisle 602. This implementation is particularly advantageous, because it can significantly reduce the travel distance and the travel time of the picking-AGVs 107 to transport these containers between the storage aisle 602 and the picking stations 510 in the pick-to-carton area 540, especially in case the picking-AGVs 107 can travel along the storage aisle 602 in opposite traffic directions. For example, as the picking-AGVs 107 can travel along the storage aisle 602 in opposite traffic directions, the picking-AGV 107 may retrieve one or more containers storing the likely-ordered item types located proximate to the front end of the storage aisle 602, make a turn in the storage aisle 602, and transport the containers to the picking station 510 without travelling through the entire storage aisle 602. This implementation can also eliminate the need for the picking-AGVs 107 to travel along the storage aisle 602 to retrieve multiple containers storing the likely-ordered item types, because the optimal positions of these containers are proximate to one another. As a result, the retrieval of the containers storing the item types that are highly likely requested in the customer orders within the future time window (e.g., time window of 2 days since the current timestamp) can be facilitated.

Figure 6B:
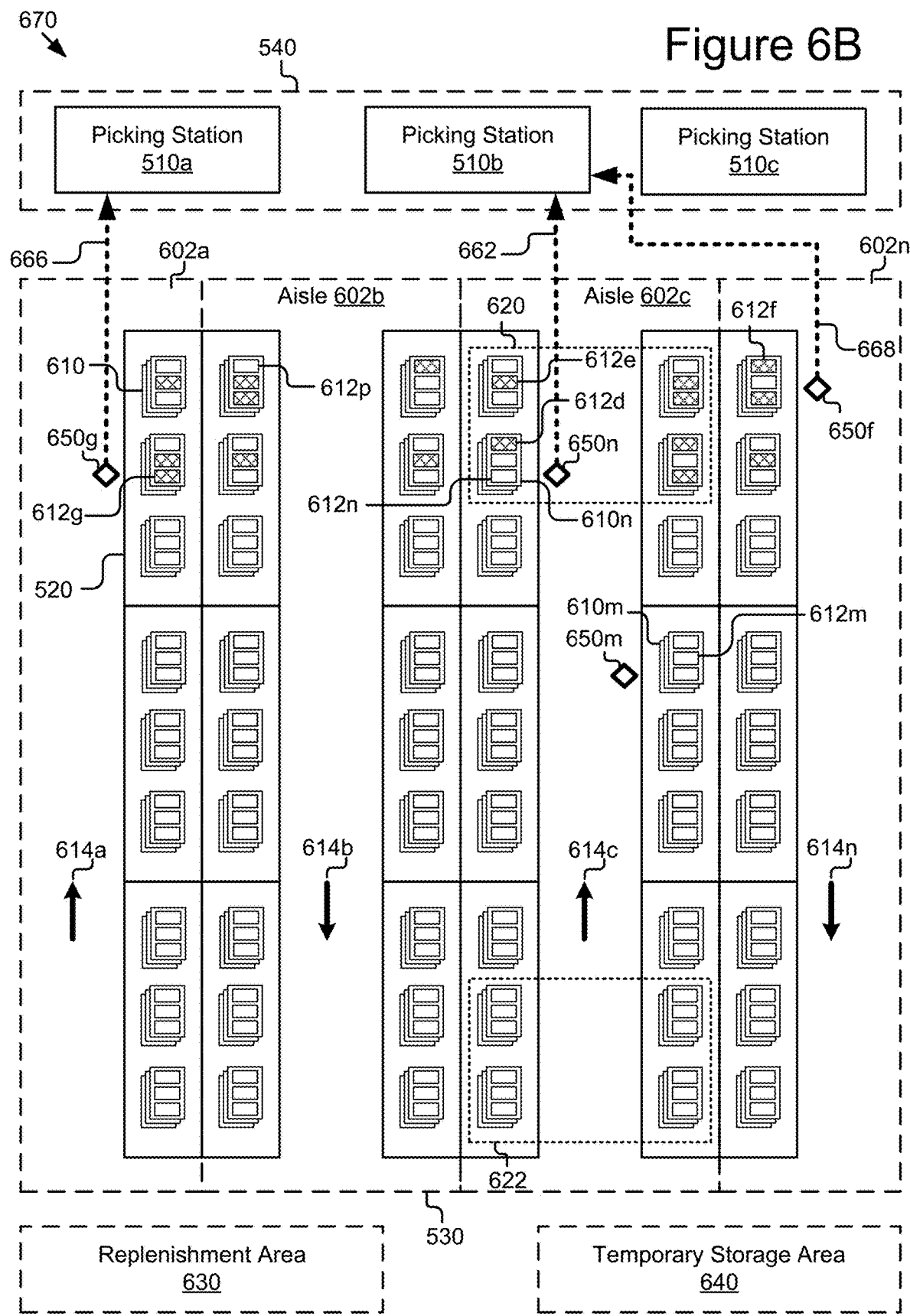
FIG. 6B illustrates an example distribution of containers storing the item types likely being ordered across multiple storage aisles in the storage facility.

As discussed above, the storage position manager 204 may aggregate the likely-ordered item types into one or more groups of likely-ordered item types that have substantially the same customer demand, assign each group of likely-ordered item types to a storage aisle 602, and determine the optimal position for the containers storing one or more likely-ordered item types in the group to be in the storage aisle 602. This implementation is particular advantageous. As the containers storing the likely-ordered item types may be distributed across multiple storage aisles 602 in a balance manner in terms of customer demand for the likely-ordered item types, this implementation can avoid the bottleneck situation caused by placing multiple containers storing the likely-ordered item types in the same storage aisle 602. FIG. 6B illustrates an example layout structure 670 of various physical areas in the storage facility with the containers storing the likely-ordered item types (depicted with cross pattern) being distributed across multiple storage aisles 602. As illustrated, multiple picking-AGVs 107 may retrieve the containers storing likely-ordered item types from the storage positions 612 in various storage aisle 602 simultaneously. For example, the picking-AGVs 107 may retrieve the containers storing the likely-ordered item types from the storage position 612d in the storage aisle 602c, the storage position 612f in the storage aisle 602n, the storage position 612g in the storage aisle 602a, etc. at the same time as respectively indicated by the travel paths 662, 668, and 666 in FIG. 6B.

Other examples for determining the optimal position for the containers in the storage facility during the optimization cycle are also possible and contemplated.

As discussed above, the AGV manager 208 may instruct the picking-AGVs 107 to transport the containers from their current positions to the optimal positions in the storage facility. Once the picking-AGV 107 transports a container from its current position to the optimal position, the picking-AGV 107 may send the task complete notification indicating that such transportation is completed to the storage position manager 204. The storage position manager 204 may then update the set of convenient item types and/or the set of inconvenient item types in the data store 119 to include the item types contained in the container. As discussed elsewhere herein, the set of convenient item types may include the item types (e.g., the items) stored in the containers that are transported to the optimal position with higher convenience metric than the previous position of the containers. Therefore, the retrieval of the item types in the set of convenient item types may be facilitated in the storage facility. On the other hand, the set of inconvenient item types may include the item types (e.g., the SKUs) stored in the containers that are transported to the optimal position with lower convenience metric than the previous position of the containers. Therefore, the retrieval of the item types in the set of inconvenient item types may not be facilitated in the storage facility.

In some embodiments, the order fulfillment manager 206 may collaboratively coordinate the fulfillment operation of the storage facility and the fulfillment operation of other storage facilities using the set of convenient item types and the set of inconvenient item types. In some embodiments, the order fulfillment manager 206 may receive a customer order requesting a first item type. In some embodiments, the order fulfillment manager 206 may determine whether the first item type is included in the set of convenient item types. If the first item type is included in the set of convenient item types, the order fulfillment manager 206 may determine that the retrieval of the first item type is facilitated in the storage facility (e.g., the container containing the first item type may be transported to an optimal position proximate to the pick-to-carton area 540 during the most recent optimization cycle). Therefore, the order fulfillment manager 206 may assign the customer order to the picking station 510 to which the first item type is assigned, and thus the customer order may be fulfilled at the picking station 510 in the storage facility.

In some embodiments, the order fulfillment manager 206 may determine whether the first item type is included in the set of inconvenient item types. If the first item type is included in the set of inconvenient item types, the order fulfillment manager 206 may determine that the retrieval of the first item type is not facilitated in the storage facility (e.g., the container containing the first item type may be transported to an optimal position in the temporary storage area 640 during the most recent optimization cycle). Thus, the order fulfillment manager 206 may reject the customer order. In some embodiments, the order fulfillment manager 206 may send to the warehouse management system 101 an order redirection request requesting the customer order to be sent to another storage facility for order fulfillment. This implementation is particularly advantageous, because the customer order may be assigned to the storage facility in which the container(s) storing the item type(s) requested in the customer order can be conveniently retrieved, and thus the customer order can be efficiently fulfilled at that storage facility.

It should be understood that the methods described herein are provided by way of example, and that variations and combinations of these methods, as well as other methods, are contemplated. For example, in some embodiments, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various embodiments are described as having particular hardware, software, and user interfaces. However, the present disclosure applies to any type of computing device that can receive data and commands, and to any peripheral devices providing services.

In some instances, various embodiments may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions, and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
estimating a first container utilization likelihood of a container in a first time window to be a highest order likelihood among one or more order likelihoods of a plurality of item types contained in the container in the first time window;
receiving an instruction to transport the container from a current position of the container to a first position in a storage aisle of a storage facility, the first position in the storage aisle determined based on the first container utilization likelihood of the container in the first time window;
instructing an automated guided vehicle (AGV) to move to a first point proximate to the current position of the container;
receiving data identifying the current position of the container;
based on the data identifying the current position of the container, instructing the AGV to retrieve the container from the current position of the container;
instructing the AGV to move to a second point proximate to the first position in the storage aisle;
receiving, from the AGV, data identifying the first position in the storage aisle; and
based on the data identifying the first position in the storage aisle, instructing the AGV to place the container at the first position in the storage aisle.

2. The method of claim 1, wherein:
the first container utilization likelihood of the container in the first time window is determined based on the one or more order likelihoods of the plurality of item types in the first time window, the container containing the plurality of item types; and
the current position of the container is one of a storage position in a temporary storage area of the storage facility and a second storage position in the storage aisle that is different from the first position in the storage aisle.

3. The method of claim 1, further comprising:
responsive to instructing the AGV to place the container at the first position in the storage aisle, updating a data file indicating the current position of the container to indicate the first position in the storage aisle; and
instructing the AGV to transport the container from the updated current position of the container to a picking station at which the container is assigned for preparing a customer order.

4. The method of claim 3, further comprising:
receiving an instruction to transport the container from the picking station to a second position in the storage aisle, the second position in the storage aisle determined based on a second container utilization likelihood of the container in a second time window, the second position in the storage aisle being different from the first position in the storage aisle; and
instructing the AGV to transport the container from the picking station to the second position in the storage aisle.

5. The method of claim 3, further comprising:
receiving an instruction to transport the container from the picking station to a second position in a temporary storage area of the storage facility, the second position in the temporary storage area being determined based on a second container utilization likelihood of the container in a second time window; and
instructing the AGV to transport the container from the picking station to the second position in the temporary storage area.

6. The method of claim 1, further comprising:
determining the first container utilization likelihood of the container in the first time window based on the one or more order likelihoods of the plurality of item types contained in the container; and
determining the first position for the container in the storage facility based on the first container utilization likelihood of the container.

7. The method of claim 1, further comprising:
determining a rank of the container based on the first container utilization likelihood of the container relative to one or more second container utilization likelihoods of one or more second containers, and
determining the first position for the container in the storage aisle based on the rank of the container.

8. The method of claim 7, wherein determining the first position for the container in the storage aisle based on the rank of the container includes:
determining a distance to a picking area of the storage facility based on the rank of the container; and
setting the first position in the storage aisle based on the distance to the picking area.

9. The method of claim 1, further comprising:
determining the one or more order likelihoods of one or more item types in the first time window using a predictive model; and
determining the first container utilization likelihood of the container in the first time window based on the one or more order likelihoods, the container containing the one or more item types.

10. A system comprising:
one or more processors; and
one or more memories storing instructions that, when executed by the one or more processors, cause the system to:
estimate a first container utilization likelihood of a container in a first time window to be a highest order likelihood among one or more order likelihoods of a plurality of item types contained in the container in the first time window;
receive an instruction to transport the container from a current position of the container to a first position in a storage aisle of a storage facility, the first position in the storage aisle determined based on the first container utilization likelihood of the container in the first time window;
instruct an automated guided vehicle (AGV) to move to a first point proximate to the current position of the container;
receive data identifying the current position of the container;
based on the data identifying the current position of the container, instruct the AGV to retrieve the container from the current position of the container;
instruct the AGV to move to a second point proximate to the first position in the storage aisle;

receive, from the AGV, data identifying the first position in the storage aisle; and based on the data identifying the first position in the storage aisle, instruct the AGV to place the container at the first position in the storage aisle.

11. The system of claim 10, wherein:

the first container utilization likelihood of the container in the first time window is determined based on the one or more order likelihoods of the plurality of item types in the first time window, the container containing the one or more item types; and the current position of the container is one of a storage position in a temporary storage area of the storage facility and a second storage position in the storage aisle that is different from the first position in the storage aisle.

12. The system of claim 10, further comprising:

responsive to instructing the AGV to place the container at the first position in the storage aisle, updating a data file indicating the current position of the container to indicate the first position in the storage aisle; and instructing the AGV to transport the container from the updated current position of the container to a picking station at which the container is assigned for preparing a customer order.

13. The system of claim 12, further comprising:

receiving an instruction to transport the container from the picking station to a second position in the storage aisle, the second position in the storage aisle determined based on a second container utilization likelihood of the container in a second time window, the second position in the storage aisle being different from the first position in the storage aisle; and instructing the AGV to transport the container from the picking station to the second position in the storage aisle.

14. The system of claim 12, further comprising:

receiving an instruction to transport the container from the picking station to a second position in a temporary storage area of the storage facility, the second position in the temporary storage area being determined based on a second container utilization likelihood of the container in a second time window; and instructing the AGV to transport the container from the picking station to the second position in the temporary storage area.

15. The system of claim 10, further comprising:

determining the first container utilization likelihood of the container in the first time window based on the one or more order likelihoods of the plurality of item types contained in the container; and determining the first position for the container in the storage facility based on the first container utilization likelihood of the container.

16. The system of claim 10, further comprising:

determining a rank of the container based on the first container utilization likelihood of the container relative to one or more second container utilization likelihoods of one or more second containers, and determining the first position for the container in the storage aisle based on the rank of the container.

17. The system of claim 16, wherein determining the first position for the container in the storage aisle based on the rank of the container includes:

determining a distance to a picking area of the storage facility based on the rank of the container; and setting the first position in the storage aisle based on the distance to the picking area.

18. A system comprising:

means for estimating a first container utilization likelihood of a container in a first time window to be a highest order likelihood among one or more order likelihoods of a plurality of item types contained in the container in the first time window;

means for receiving an instruction to transport the container from a current position of the container to a first position in a storage aisle of a storage facility, the first position in the storage aisle determined based on the first container utilization likelihood of the container in the first time window;

means for instructing an automated guided vehicle (AGV) to move to a first point proximate to the current position of the container;

means for receiving data identifying the current position of the container;

means for based on the data identifying the current position of the container, instructing the AGV to retrieve the container from the current position of the container;

means for instructing the AGV to move to a second point proximate to the first position in the storage aisle;

means for receiving, from the AGV, data identifying the first position in the storage aisle; and means for based on the data identifying the first position in the storage aisle, instructing the AGV to place the container at the first position in the storage aisle.

* * * * *